United States Patent [19]

Souma et al.

[11] Patent Number: 4,783,876

[45] Date of Patent: Nov. 15, 1988

[54] CONCEALABLE WIPER APPARATUS FOR VEHICLE

[75] Inventors: Kazuo Souma; Osamu Kondo; Yasunori Hirosawa; Souichirou Okudaira, all of Aichi-ken; Ikuo Souda; Yukio Honda, both of Shizuoka-ken, all of Japan

[73] Assignee: Toyota Jidosha Kabushiki Kaisha, Toyota, Japan

[21] Appl. No.: 903,323

[22] Filed: Sep. 3, 1986

[30] Foreign Application Priority Data

Sep. 3, 1985 [JP] Japan .................................. 60-194676
Oct. 8, 1985 [JP] Japan .................................. 60-233057
Oct. 18, 1985 [JP] Japan .................................. 60-233055
Nov. 22, 1985 [JP] Japan .................................. 60-263159

[51] Int. Cl.$^4$ .............................. B60S 1/02; B60S 1/26
[52] U.S. Cl. .............................. 15/250.17; 15/250.02; 15/250.21; 15/250.35; 296/192; 296/96.15; 296/24.1
[58] Field of Search .......... 15/250.17, 250.21, 250.23, 15/250.35, 250.19, 250.01, 250.02, 256 C, 250.16; 296/24 R, 84 R, 84 D, 192

[56] References Cited

U.S. PATENT DOCUMENTS

| | | | |
|---|---|---|---|
| 2,516,808 | 7/1950 | Seger ............................... | 15/250.21 |
| 2,895,157 | 7/1959 | Kocourek . | |
| 2,936,477 | 5/1960 | Feller . | |
| 3,120,673 | 2/1964 | Buchwald . | |
| 3,121,902 | 2/1964 | Massoll . | |
| 3,247,540 | 4/1966 | Howard et al. . | |
| 3,570,039 | 3/1971 | Ichinose . | |
| 3,681,812 | 8/1972 | Colucci ............................. | 15/250.19 |
| 3,694,846 | 10/1972 | Parker . | |

FOREIGN PATENT DOCUMENTS

| | | | |
|---|---|---|---|
| 55-429 | 11/1938 | Denmark .......................... | 15/250.35 |
| 645789 | 12/1935 | Fed. Rep. of Germany ... | 15/250.21 |
| 2832411 | 2/1980 | Fed. Rep. of Germany . | |
| 2852187 | 6/1980 | Fed. Rep. of Germany . | |
| 3435875 | 6/1985 | Fed. Rep. of Germany . | |
| 60-65161 | 5/1985 | Japan . | |
| 60-75157 | 5/1985 | Japan . | |
| 469582 | 9/1969 | Switzerland . | |
| 510538 | 9/1971 | Switzerland . | |
| 2154861 | 9/1985 | United Kingdom . | |

OTHER PUBLICATIONS

Patent Abstracts of Japan, vol. 7, No. 145 (M-224), [1290], Jun. 24, 1983.
Nuu et al., Abstract "Windshield Wiper for Automobile", Japanese appln. laid-open No. 58-56947(A), filed by Toyo Kogyo K.K., 4/4/83.

*Primary Examiner*—Peter Feldman
*Attorney, Agent, or Firm*—Cushman, Darby & Cushman

[57] ABSTRACT

A concealable wiper apparatus for a vehicle has a wiper assembly disposed in such a manner that the wiper assembly can be accommodated in an accommodating chamber provided inside the body of the vehicle and in the vicinity of a window glass. The wiper assembly is vertically moved between an accommodated position at which it is accommodated in the accommodating chamber and a raised position at which the wiper assembly wipes the window glass. In addition, a wiper arm which supports a wiper blade that wipes the window glass is adapted to be capable of expansion and contraction. Accordingly, when the wiper is not used, the wiper apparatus is accommodated in the accommodating chamber, so that it is possible to minimize the air resistance to the vehicle and reduce the size of the accommodating chamber.

44 Claims, 23 Drawing Sheets

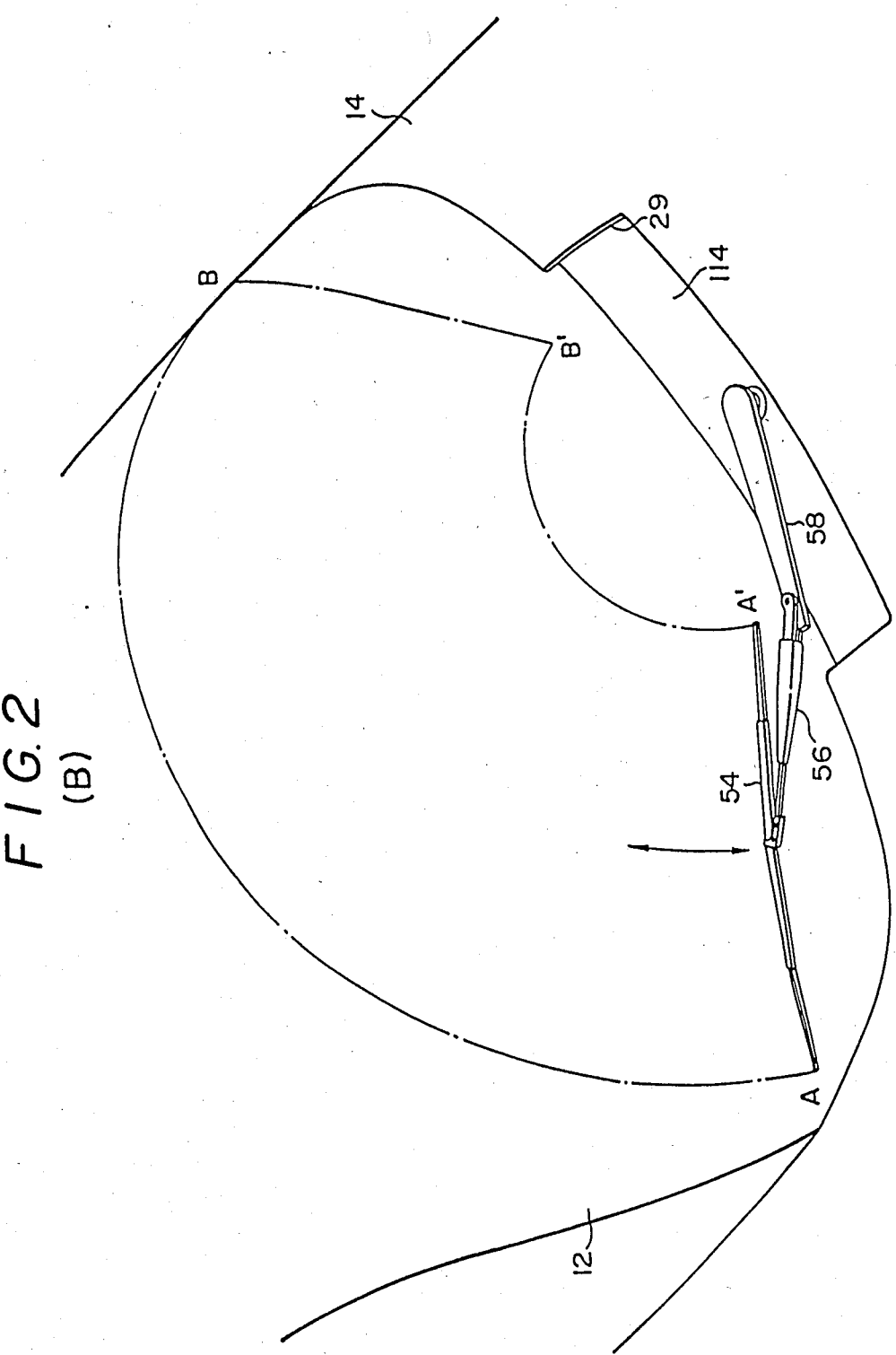

(A)

(B)

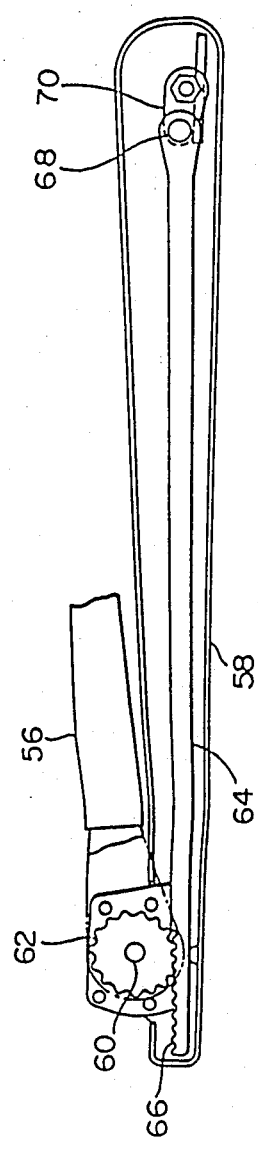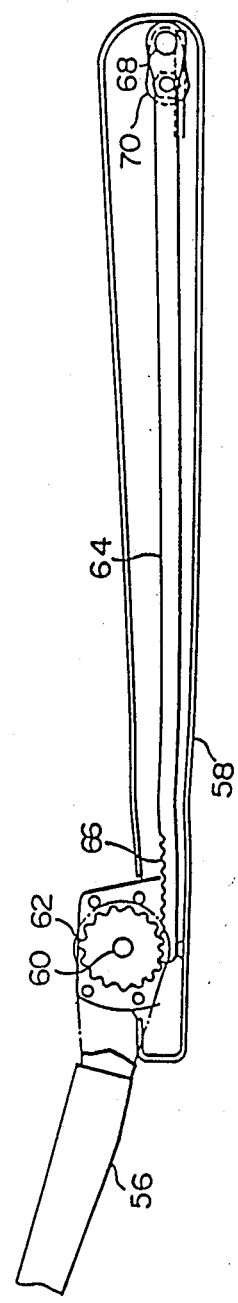
FIG. 7 (A)
FIG. 7 (B)

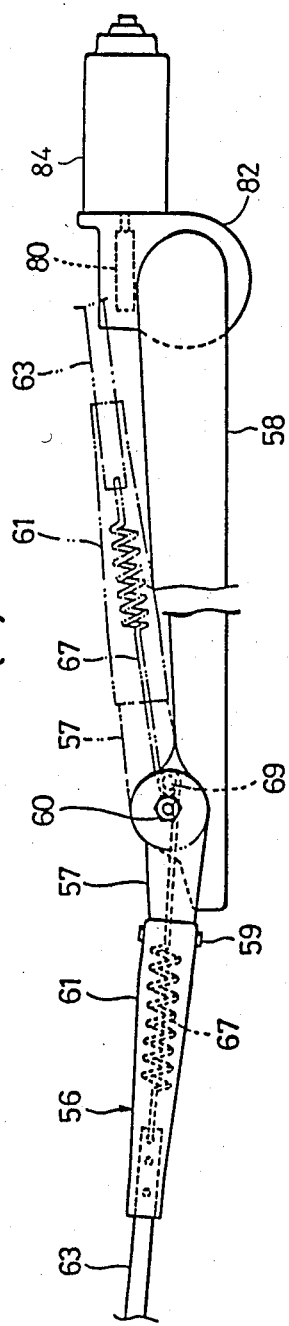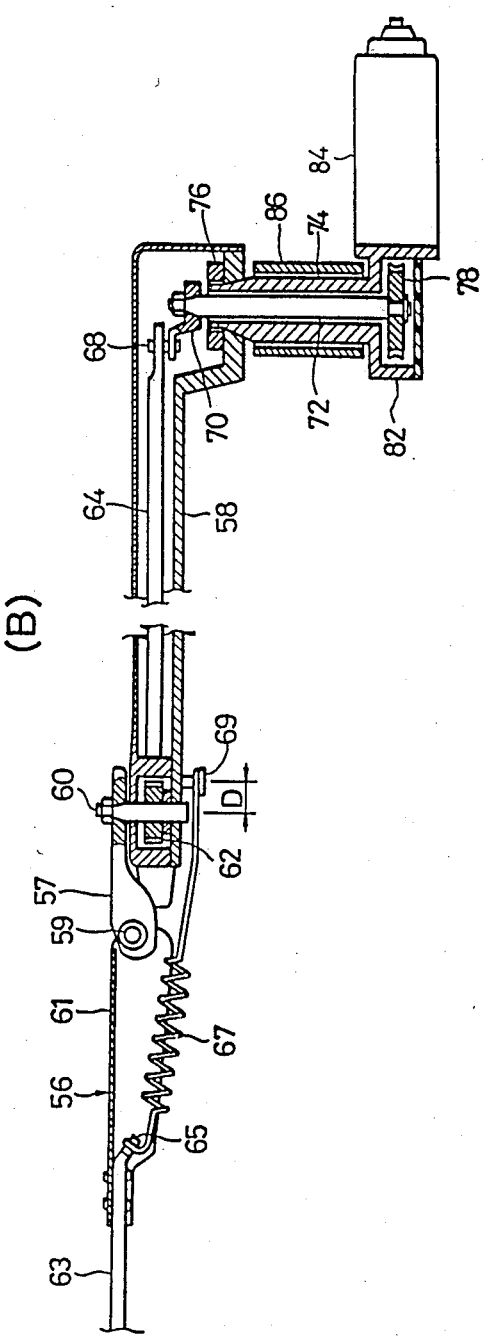
FIG. 8 (A)
FIG. 8 (B)

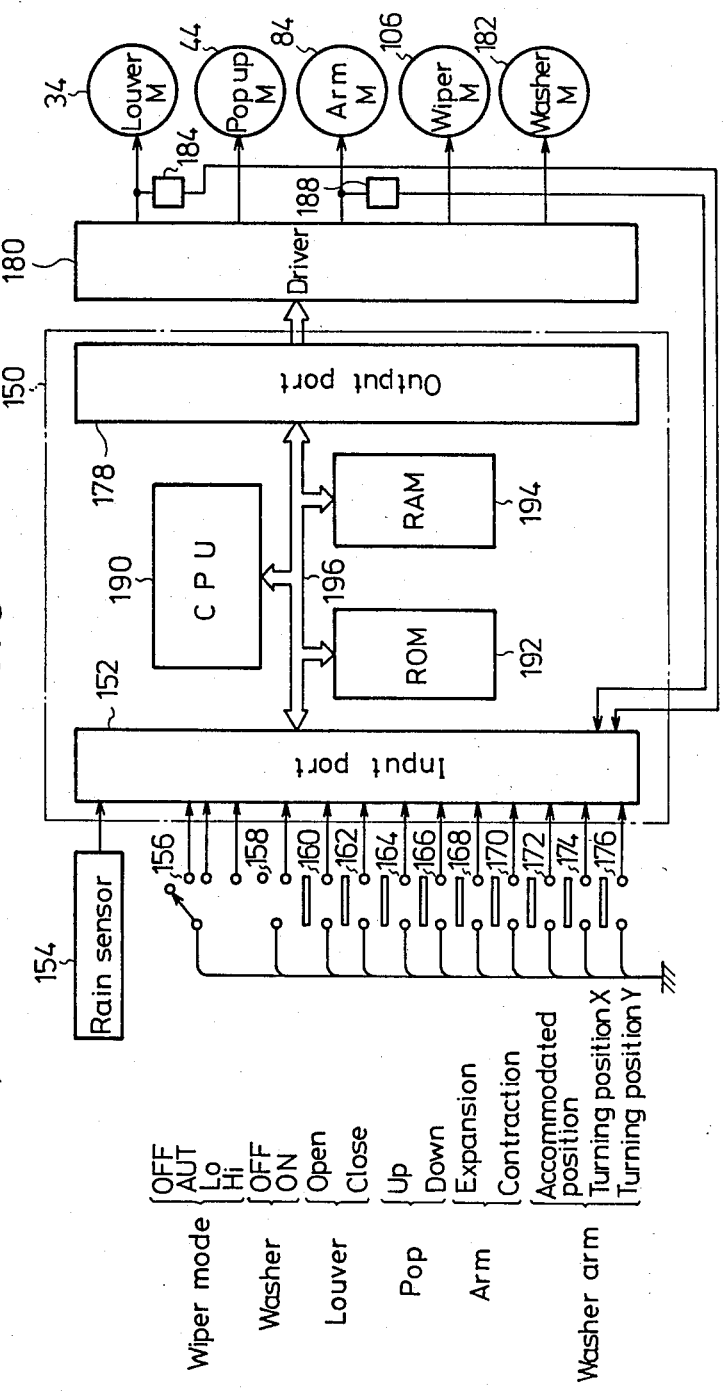

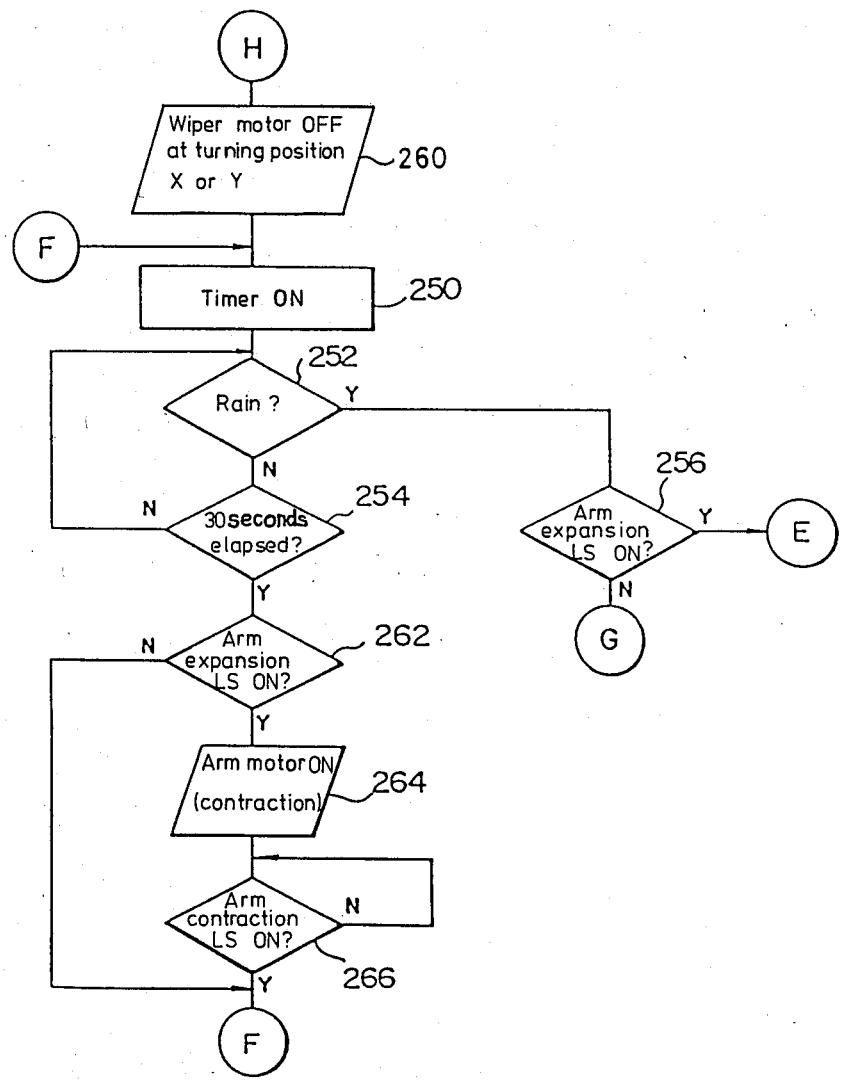

(A)

(B)

CONCEALABLE WIPER APPARATUS FOR VEHICLE

BACKGROUND OF THE INVENTION

1. Field of the Invention

The present invention relates to a concealable wiper apparatus for a vehicle so designed that a wiper assembly is accommodated in an accommodating chamber provided inside the body of the vehicle and in the vicinity of a window glass.

2. Description of the Related Art

Conventional wiper apparatuses of the type described above undesirably involve a difference in level between the hood and the front glass due to the arrangement of the wiper assembly. In consequence, the air resistance to the vehicle is increased, and the external appearance of the vehicle is degraded. Further, since a part of the wiper assembly projects from the outer surface of the vehicle even when the wiper is not used, the wiper assembly may be subjected to an undesirable external force by interference with a car cover, a car washing machine or the like.

SUMMARY OF THE INVENTION

In view of the above-described circumstances, it is a primary object of the present invention to provide a concealable wiper apparatus for a vehicle which is so designed that it is possible to reduce the air resistance to the vehicle, improve the external appearance of the vehicle, and protect the wiper assembly from any external force.

To this end, the present invention provides a concealable wiper apparatus for a vehicle, comprising: an accommodating chamber provided inside the body of the vehicle and in the vicinity of a window glass; a wiper assembly accommodated in the accommodating chamber; and lifting means for vertically moving the wiper assembly between an accommodated position at which the wiper assembly is accommodated in the accommodating chamber and a raised position at which the wiper assembly wipes the window glass.

By virtue of the above-described arrangement, when the wiper is not used, the wiper assembly is accommodated in the accommodating chamber, so that the air resistance to the vehicle is reduced. In addition, since no part of the wiper assembly projects to the outer surface of the vehicle, there is no fear of the wiper assembly being subjected to any undesirable external force. When the wiper is to be used, the wiper assembly is raised by the action of the lifting means, and the wiper is then activated to wipe the window glass.

The above and other objects, features and advantages of the present invention will become clear from the following description of the preferred embodiments thereof, taken in conjunction with the accompanying drawings.

BRIEF DESCRIPTION OF THE DRAWINGS

FIGS. 7(A) and 7(B) are plan views showing the internal structure of the wiper arm;

FIG. 8(A) is a plan view of the wiper arm;

FIG. 8(B) is a longitudinal sectional view of the wiper arm shown in FIG. 8(A);

FIG. 9 shows a wiper control circuit;

DESCRIPTION OF THE PREFERRED EMBODIMENTS

Preferred embodiments of the present invention will be described hereinunder with reference to the accompanying drawings.

Figure 3:
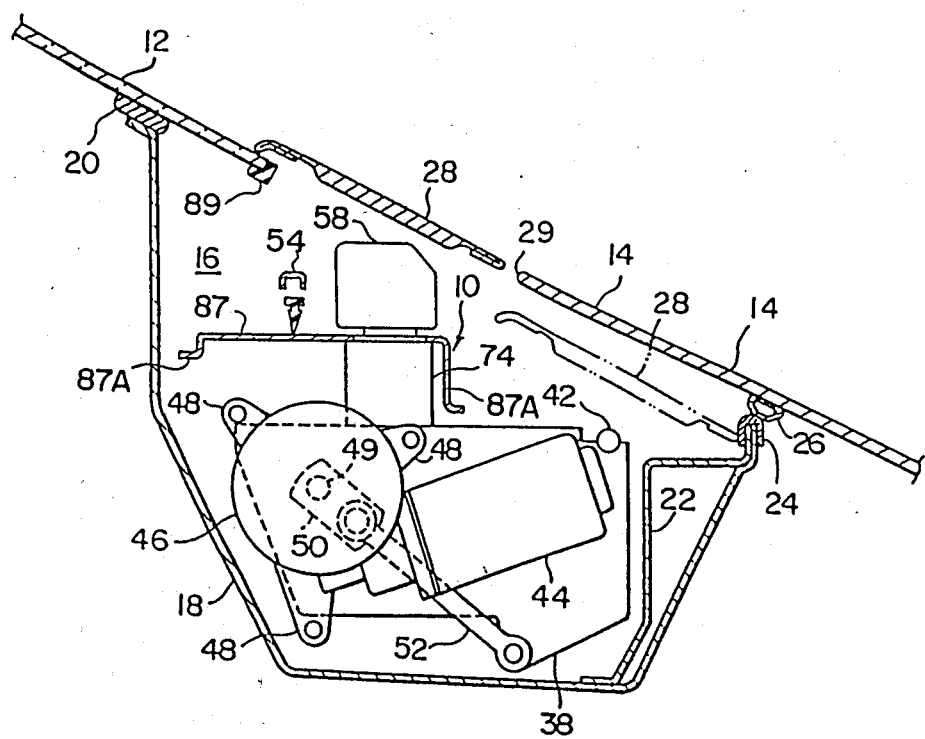
FIG. 3(A) is a vertical sectional view showing the wiper assembly accommodated in the accommodating chamber.
FIG. 3(B) is a vertical sectional view showing the wiper assembly in a state wherein the louver is opened and the wiper assembly is popped up.
Figure 3:
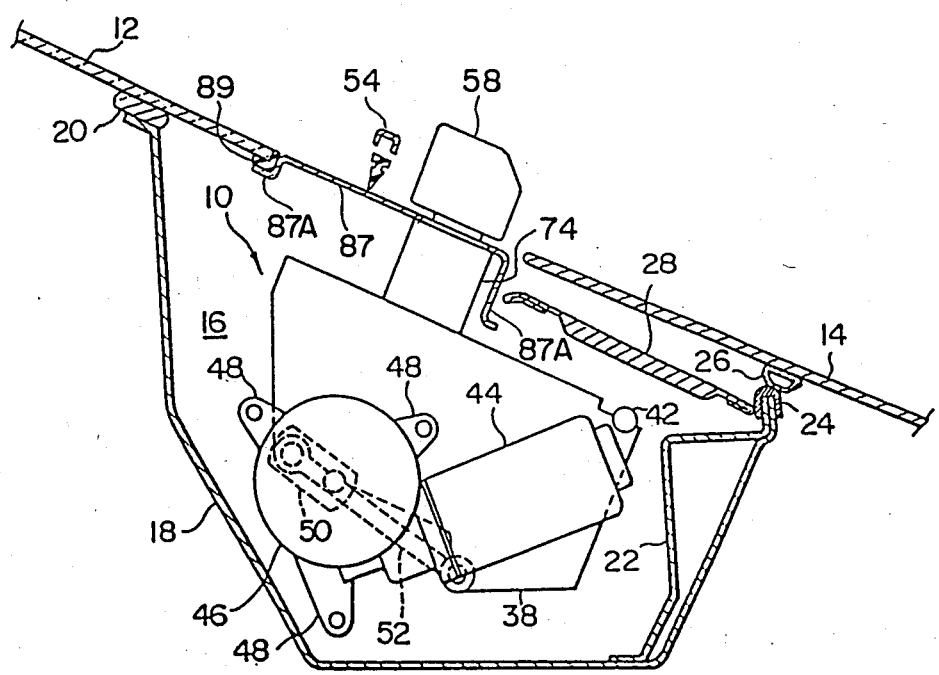

Referring first to FIG. 3, which shows a first embodiment of the present invention, a wiper assembly 10 is accommodated in an accommodating chamber 16 provided between a front glass 12 and a hood 14.

The accommodating chamber 16 is defined by a cowl inner member 18 which is horizontally carried by front pillars (not shown). One end of the cowl inner member 18 on the side thereof which is closer to the rear end of the vehicle is bonded to the front glass 12 by means of an adhesive 20. A reinforcement member 22 is provided on the side of the cowl inner member 18 which is closer to the front end of the vehicle in such a manner that the front end portion of the reinforcement member 22 and the front end portion of the cowl inner member 18 are superposed one upon the other and clamped by a weatherstrip retaining member 24. A weatherstrip sealing member 26 is stuck to the reverse surface of the hood 14 in opposing relation to the weatherstrip retaining member 24, thereby ensuring sealing between the hood 14 and the cowl inner member 18.

Figure 2:
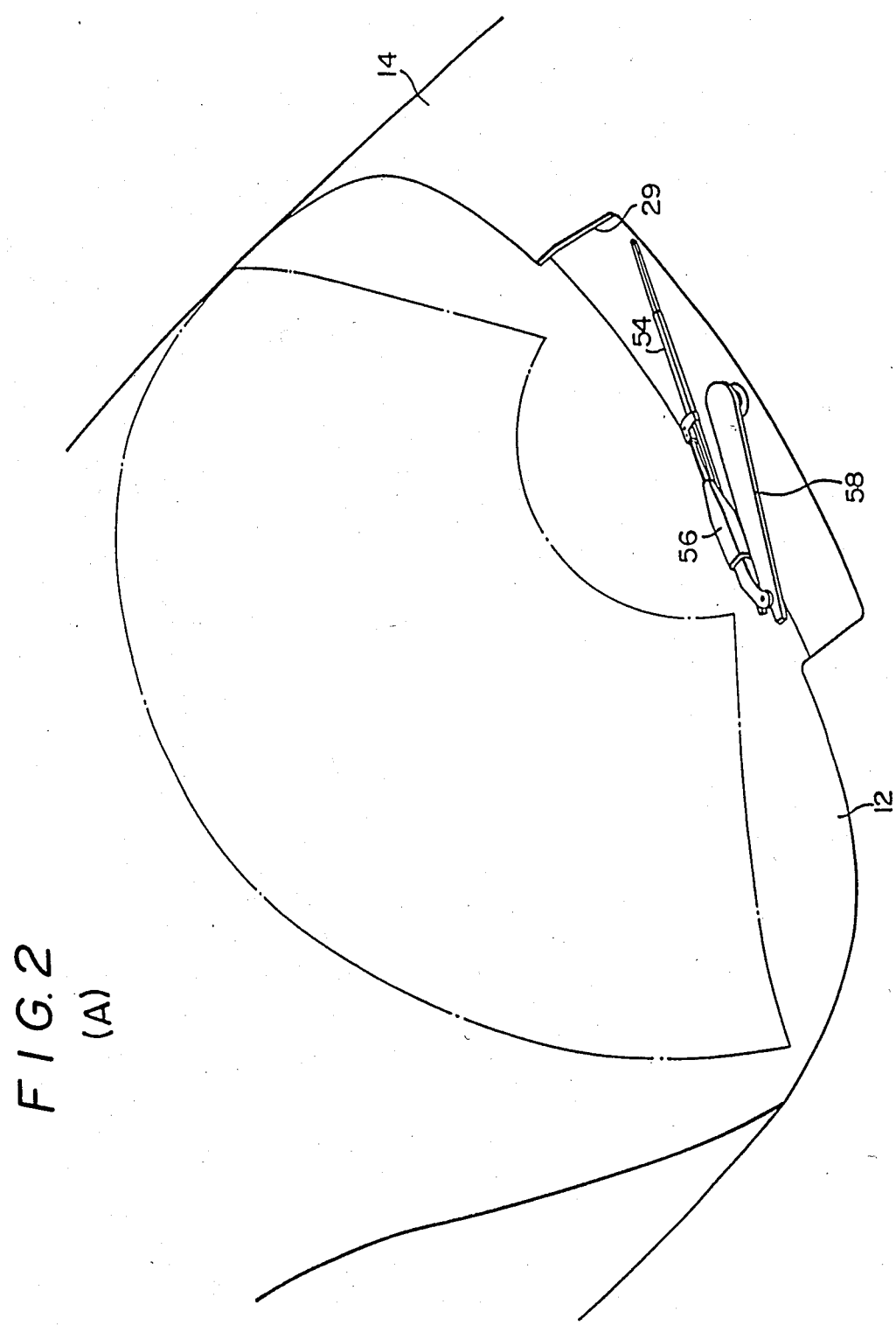
FIG. 2(A) is a perspective view showing the wiper assembly in a rise-up state.
FIG. 2(B) is a perspective view showing the wiper assembly in a state wherein the first arm which is bent in the state shown in FIG. 2(A) is stretched.

As shown in FIG. 2(A), an opening 29 having a substantially rectangular cross-section is provided between the front glass 12 and the hood 14 by cutting the hood 14. This opening 29 is closed by a louver 28 which is slidably provided so as to selectively close and open the opening 29. When the louver 28 is in the state shown in FIG. 3(A), the surface of the louver 28 and the surfaces of respective portions of the front glass 12 and the hood 14 which are near the louver 28 are flush with each other in order to minimize the air resistance to the vehicle.

Figure 1:
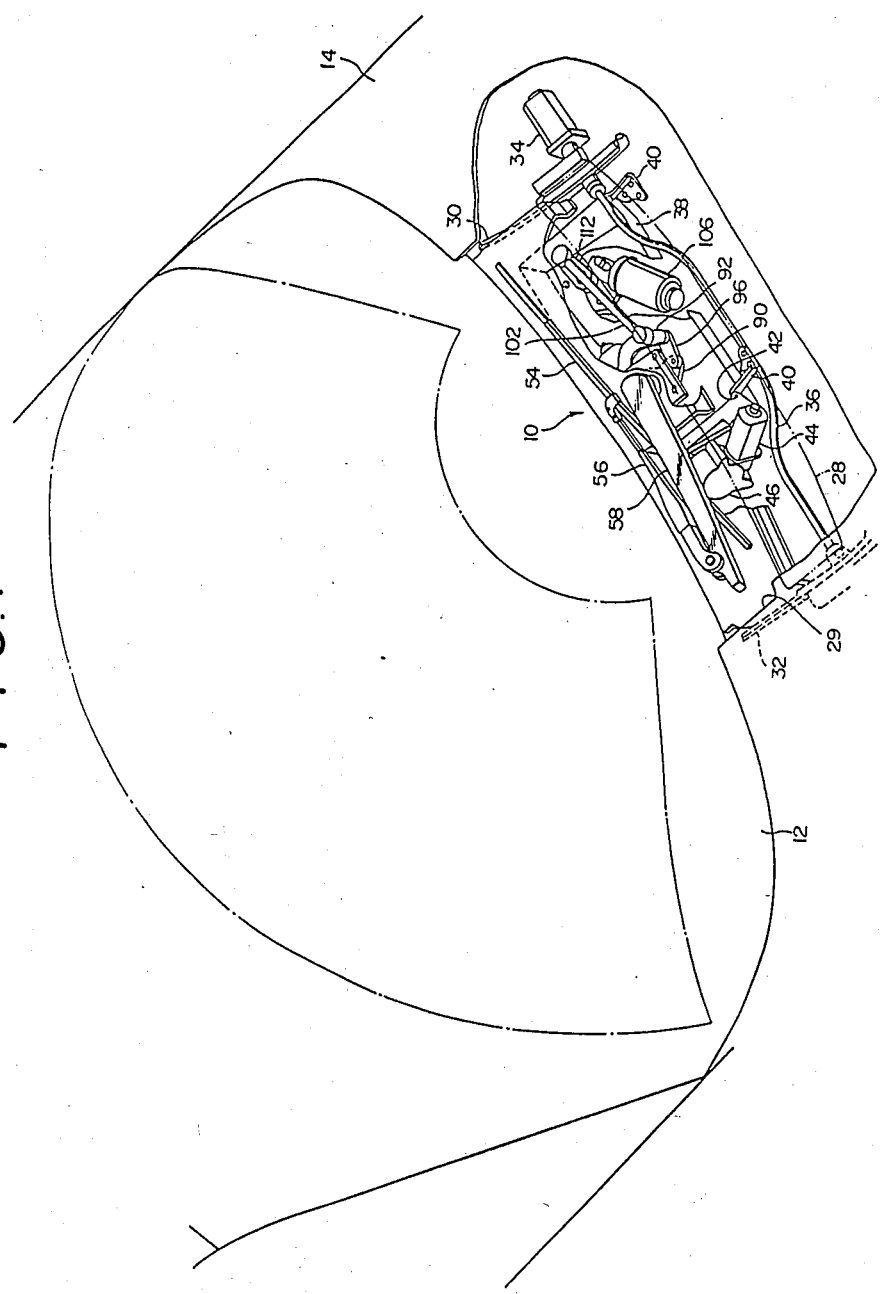
FIG. 1 is a partially-cutaway perspective view of a first embodiment of the present invention, which shows the wiper assembly which is accommodated in an accommodating chamber defined by a cowl inner member of a vehicle.

Referring now to FIG. 1, the louver 28 is adapted to slide while being guided by a pair of guide rails 30 and 32 which are provided along both edges (in the lateral direction of the vehicle), respectively, of the opening 29. As will be clear from FIG. 4, a slider 11 is provided in such a manner as to be movable along the guide rail 30. More specifically, both longitudinal end portions on one side of the slider 11 are supported by the guide rail 30 through supporting members 11A and 11B, respectively. A rack 13 is formed on the other side of the slider 11, and meshed with a pinion 15. The pinion 15 is operatively connected to a louver motor 34 shown in FIG. 1, the motor 34 being rigidly secured to the body of the vehicle. The louver 28 has brackets 17 and 19 projecting from the lower surface thereof. The bracket 17 is provided with a slot 21 which receives a pin 23 which projects from the slider 11. The bracket 19 is pivotally supported at one end portion of a link bar 25 which, in turn, is pivotally supported by the slider 11. Both end portions of a torsion spring 27 are respectively retained by the other end portion of the link bar 25 and the slide 11 in such a manner that the link bar 25 is biased so as to pivot in the direction of the arrow P. A safety plate 29 is rigidly secured to the vehicle body in order to prevent the link bar 25 from pivoting counter to the direction of the arrow P so as to rise undesirably. A stopper 31 is rigidly secured to the upper end of the guide rail 30 to limit the movement of the bracket 17 toward the front glass 12.

Figure 4A:
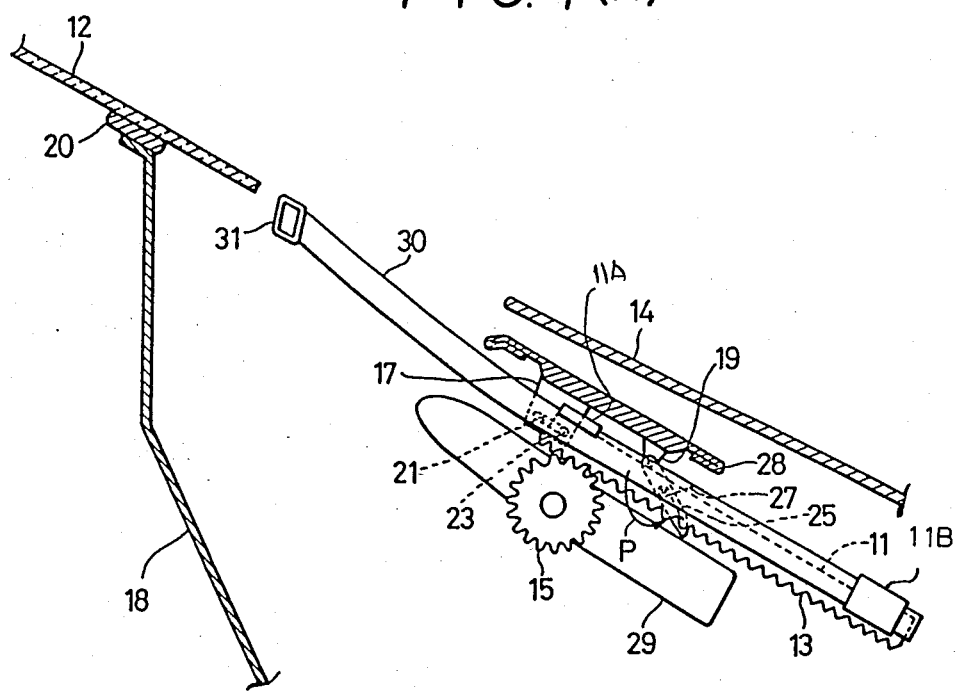
FIGS. 4(A) to 4(C) are front views showing the arrangement of the louver.
Figure 4:
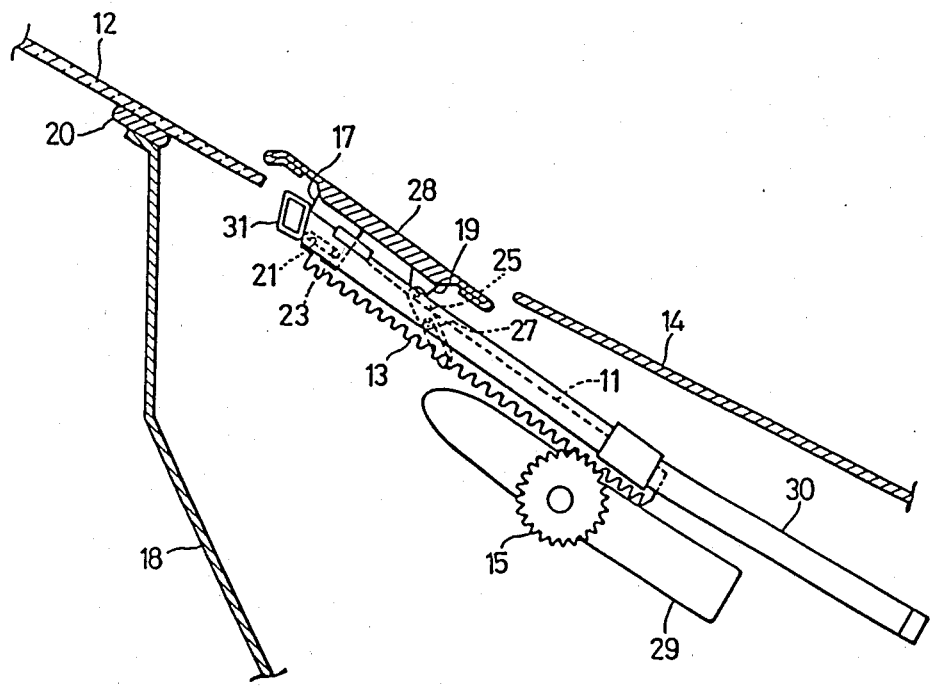
Figure 4C:
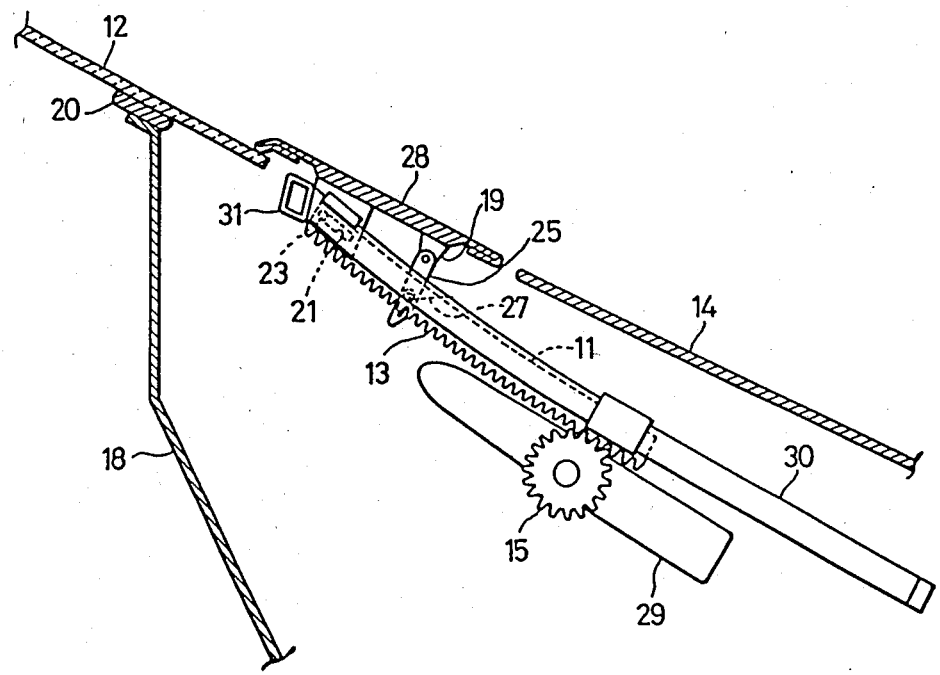

When the louver 28 is in the open position shown in FIG. 4(A), if the pinion 15 is rotated counterclockwise, the louver 28 slides along the guide rail 30 toward the front glass 12 until the bracket 17 abuts against the stopper 31 as shown in FIG. 4(B). As the pinion 15 is rotated further in the same direction, i.e., counterclockwise, the pin 23 is guided by the slot 21, and the distal end of the slider 11 abuts against the stopper 31. At this time, the bracket 19 is moved relative to the slider 11 toward the lower end of the guide rail 30 (toward the front end of the vehicle). In consequence, the link bar 25 pivots clockwise to rise against the biasing force from the torsion spring 27, so that the upper end of the louver 28 abuts against the upper surface of the lower end portion of the front glass 12 as shown in FIG. 4(C).

The portion of the louver 28 on the side thereof which is closer to the guide rail 32 is driven by the rotational force derived from the louver motor 34 which is transmitted through a cable accommodated in a pipe 36 and through a combination of a rack and a pinion similar to the above.

The drive unit for driving the wiper assembly 10 is accommodated in a wiper box 38. This wiper box 38 is supported by a pair of hinges 40 which are rigidly secured to the reinforcement member 22 so that the wiper box 38 is pivotal about a supporting point 42. The driving source for this pivotal motion of the wiper box 38 is a pop-up motor 44. A worm (not shown) is secured to the rotating shaft of the pop-up motor 44, and meshed with a worm wheel (not shown) which is accommodated in a casing 46. The pop-up motor 44 is rigidly secured to the casing 46, and the casing 46 is rigidly secured through projecting portions 48 to a reinforcement member (not shown) which extends perpendicularly to the cowl inner member 18, i.e., to one side wall of the accommodating chamber 16. An arm 50 is secured to a rotating shaft 49 of the above-described worm wheel. The distal end of the arm 50 and one side surface of the wiper box 38 are connected by a rod 52 so that the pivotal motion of the arm 50 causes the wiper box 38 to pivot about the supporting point 42.

Accordingly, if, in the state shown in FIG. 3(A), the louver motor 34 is rotated forward to slide the louver 28 so as to open the opening 29 and the pop-up motor 44 is rotated forward, the wiper assembly 10 is popped up as shown in FIG. 3(B).

As shown in FIG. 1, the wiper assembly 10 is provided with a wiper blade 54 for wiping away raindrops or the like on to the front glass 12. The wiper blade 54 is supported at the central portion thereof by a first arm 58 through a second arm 56. Referring to FIGS. 7 and 8, the second arm 56 is pivotally supported by the first arm 58 through an arm stretching shaft 60 rigidly secured to the arm 56. A pinion 62 is rigidly secured to the arm stretching shaft 60 in coaxial relation thereto and is incorporated in the first arm 58. The first arm 58 further incorporates a rod 64 which is provided at one end portion thereof with a rack 66 that is meshed with the pinion 62. The other end portion of the rod 64 is operatively connected to a crank arm 70 through a pin 68. Accordingly, as the crank arm 70 pivots, the rod 64 is linearly moved, and the pinion 62 is consequently rotated, thus causing the second arm 56 to pivot about the arm stretching shaft 60. In other words, it is possible to fold the second arm 56 in such a manner that it is laid on the first arm 58.

Accordingly, it is possible to minimize the space required to provide the accommodating chamber 16 and reduce the size of the apparatus as a whole.

Referring to FIG. 8, a second arm head 57 of the second arm 56 is pivotally supported by the first arm 58 through the arm stretching shaft 60. The second arm head 57 pivotally supports one end portion of a retainer 61 through a pin 59. One end portion of a second arm piece 63 is rigidly secured to the other end portion of the retainer 61. The wiper blade 54, shown in FIG. 1, is rigidly secured to the other end portion of the second arm piece 63. A hook 65 is formed at the first end of the second arm piece 63 so as to retain one end of a tension coil spring 67. The first arm 58 has a hook 69 projecting from a position thereon which is a distance D apart from the arm stretching shaft 60 to the right of the shaft 60 as viewed in FIG. 8, the hook 69 retaining the other end of the spring 67.

Referring to FIG. 8(A), when the second arm 56 is stretched in such a manner as to extend in the longitudinal direction of the first arm 58, the second arm piece 63 is subjected to a counterclockwise moment about the pin 59 by the biasing force from the tension coil spring 67, whereby the wiper blade 54 is pressed against the front glass 12. As illustrated by the two-dot chain line in FIG. 8(A), when the second arm 56 is in a folded state, the length of the tension coil spring 67 is 2D shorter than that in the case where the second arm 56 is stretched, and the pulling force of the spring 67 is reduced correspondingly. Accordingly, the drag which is applied to the wiper blade 54 from the front glass 12 becomes sufficiently small so that no unnecessarily large force is applied to the wiper blade 54 when the wiper is not used. Thus, it is possible to prevent deformation of the rubber member of the wiper blade 54, that is, lowering in the wiping function of the wiper blade 54.

It should be noted that a compression coil spring may be employed in place of the tension coil spring 67. In such a case, a spring retainer is provided in place of the hook 69 and disposed at a position to the left of and on the upper side of the arm stretching shaft 60 as viewed in FIG. 8(A).

Figure 5:
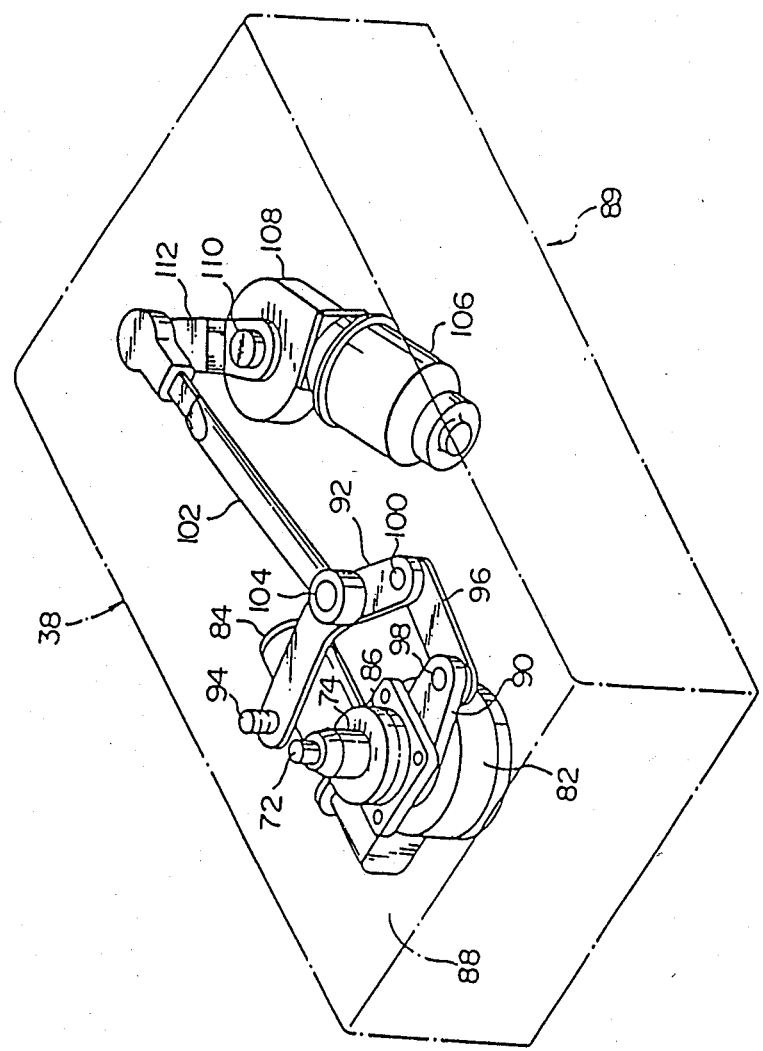
FIG. 5 is a perspective view of driving means for stretching and pivoting the wiper arm.

The crank arm 70 is rigidly secured to one end portion of an arm stretching driving shaft 72. The shaft 72 is rotatably supported by an inner bearing 74 which also serves as a wiper arm pivoting shaft. The distal end portion of the inner bearing 74 is rigidly secured to the first arm 58 by means of a nut 76. A worm wheel 78 is rigidly secured to the lower end portion of the arm stretching driving shaft 72, and a worm 80 is meshed with the worm wheel 78. The worm wheel 78 and the worm 80 are incorporated in a casing 82 from which the inner bearing 74 projects. The worm 80 is rotated by an arm stretching motor 84 which is rigidly secured to the casing 82. The inner bearing 74 is rotatably supported by an outer bearing 86 in such a manner that the first arm 58, the inner bearing 74, the casing 82 and the arm stretching motor 84 pivot together in one unit. The outer bearing 86 is rigidly secured to an upper plate 88 of the wiper box 38 as shown in FIG. 5.

The arm stretching motor 84 is disposed on the side of the arm stretching driving shaft 72 which is remote from the first arm 58, so that the moment about the inner bearing 74 based on the gravity acting on the wiper blade 54, the second arm 56 and the first arm 58 is canceled by the moment about the inner bearing 74 based on the gravity acting on the arm stretching motor 84. Accordingly, it is possible to prevent the inner and outer bearings 74 and 86 from becoming worn locally to a substantial extent, which phenomenon would otherwise occur due to the eccentricity of the inner bearing 74 with respect to the outer bearing 86.

Referring to FIG. 3(A), a mole 87 which serves as a closure member is rigidly secured to the inner bearing 74. The mole 87 has a substantially rectangular configuration, and the upper and lower edges 87A of the mole 87 are bent in an L-shape. A shield rubber member 89 is bonded to the lower end portion of the front glass 12 in opposing relation to the upper end portion of the mole 87. Thus, when the wiper assembly 10 is popped up, the upper edge 87A of the mole 87 is in pressure contact with the shield rubber member 89 to close the opening 29 as shown in FIG. 3(B). Accordingly, even when the wiper assembly 10 is in a rise-up state, there is no fear of dust or the like entering the accommodating chamber 16.

Since, in this state, the mole 87 is substantially flush with the front glass 12 and the hood 14, it is possible to reduce the air resistance to the vehicle. In addition, the external appearance of the vehicle is improved.

Referring to FIG. 5, link arm 90 is rigidly secured to the casing 82, while a link arm 92 is pivotally supported by the upper plate 88 through a pin 94. The link arms 90 and 92 are operatively connected by a link bar 96 through pins 98 and 100. The link arms 90, 92 and the link bar 96 constitute in combination a U-link. One end portion of a rod 102 is pivotally supported by the intermediate portion of the link arm 92 through a pin 104. A wiper motor 106 is rigidly secured to a casing 108. This casing 108 incorporates a worm (not shown) which is secured to the rotating shaft of the wiper motor 106 and a worm wheel (not shown) which is supported on an arm driving shaft 110. The casing 108 is rigidly secured to a lower plate 89 of the wiper box 38. An arm 112 is rigidly secured to the arm driving shaft 110. The distal end portion of the arm 112 is rotatably connected to the rod 102.

Accordingly, as the wiper motor 106 is activated, the arm 112 is turned, and the link arm 92 is thereby pivoted about the pin 94 through the rod 102. In consequence, the link arm 90 is pivoted through the link bar 96, thus causing the arm motor 84, the inner bearing 74 and the first arm 58 shown in FIG. 8 to pivot together in one unit.

Figure 6:
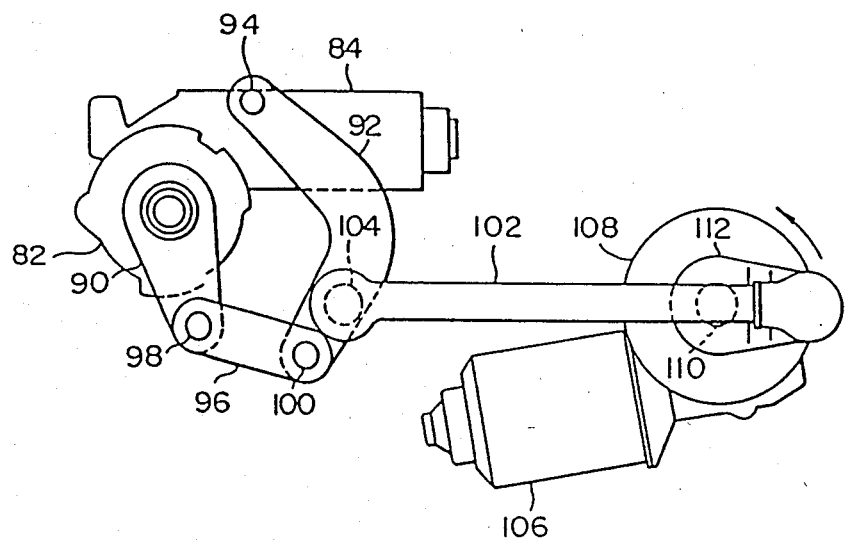
FIGS. 6(A) to 6(C) are plan views employed to describe the operation of the driving means shown in FIG. 5.
Figure 6:
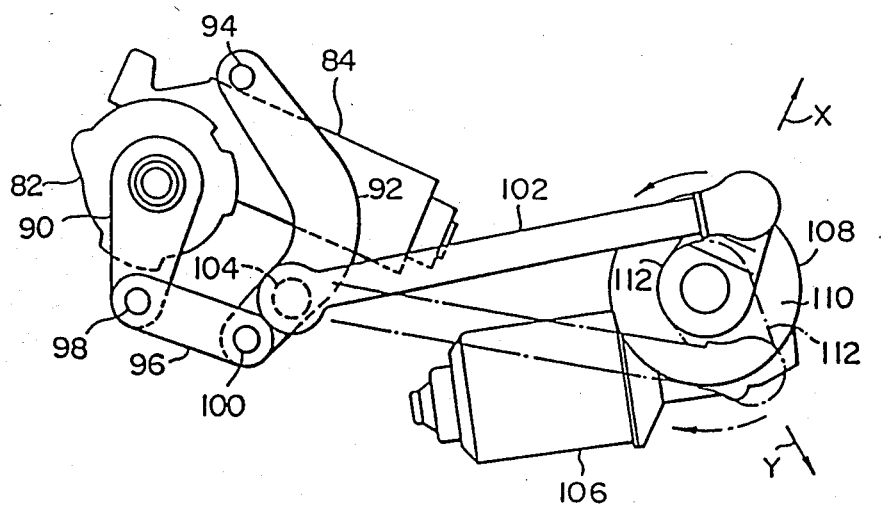
Figure 6:
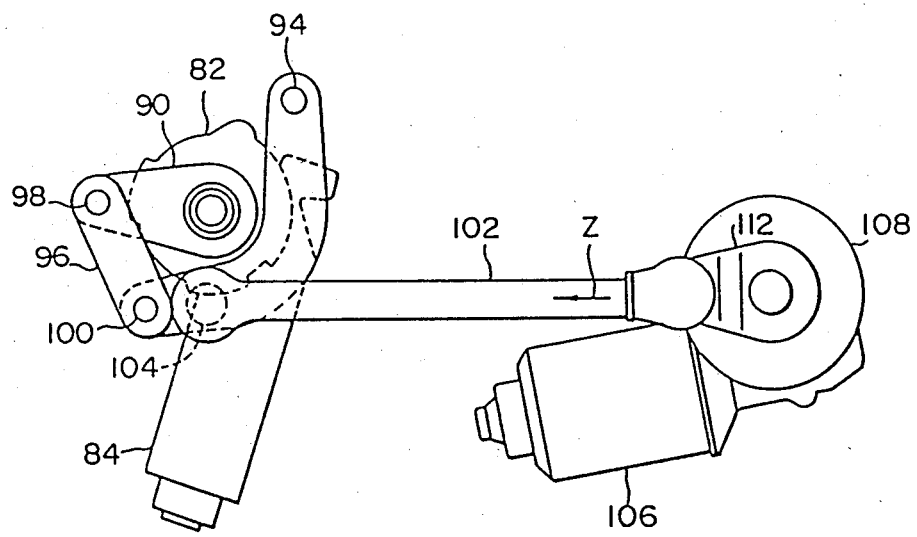
Figure 10A:
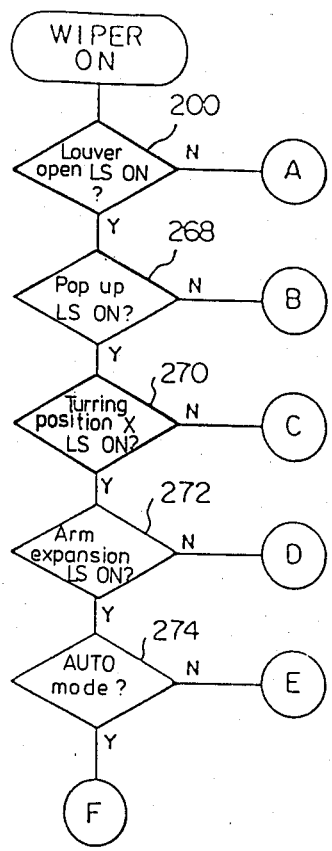
FIGS. 10 to 13 are flowcharts showing the control of the wiper and the washer.
Figure 10B:
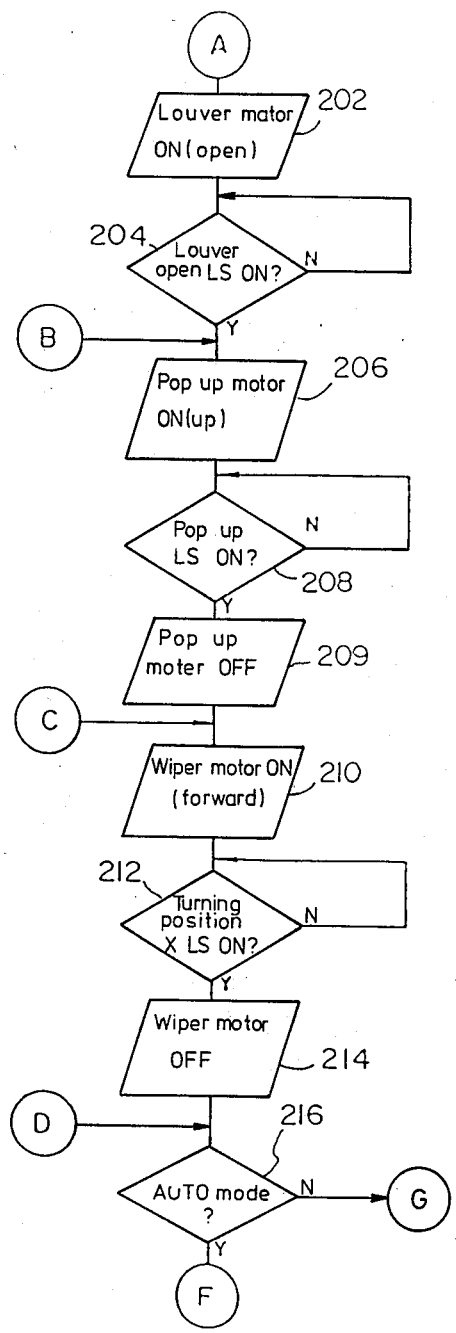
Figure 10C:
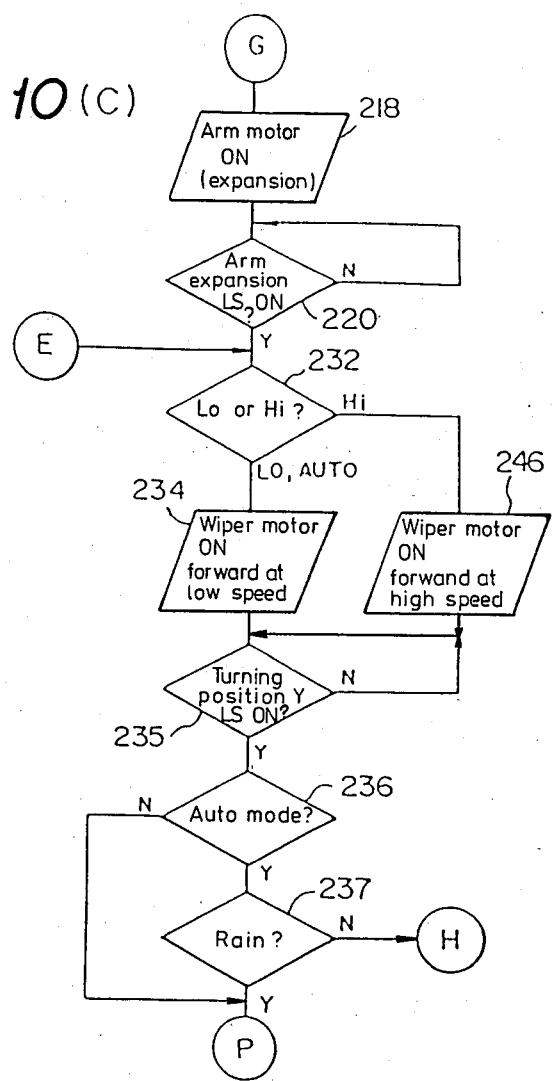
Figure 11:
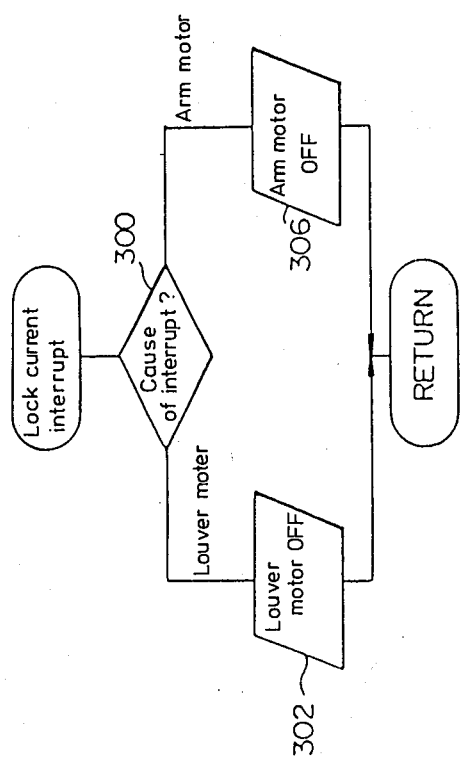
Figure 10D:
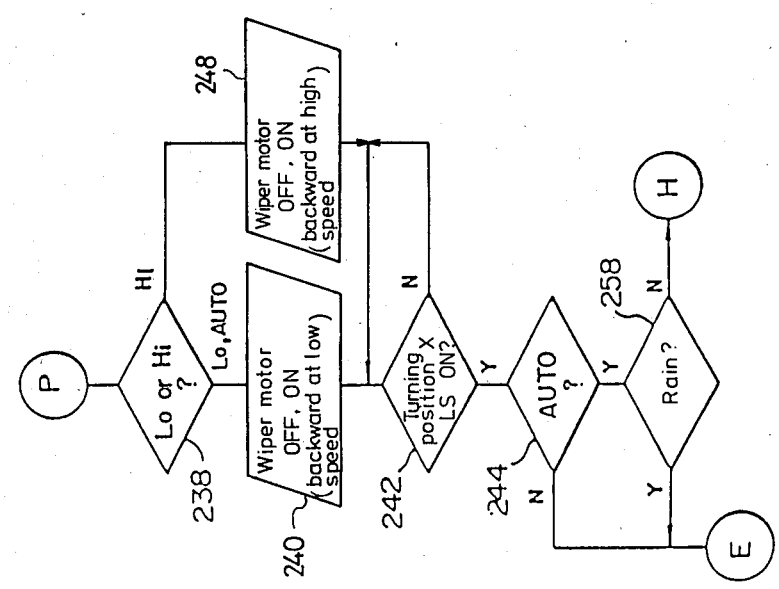

FIGS. 6(A) to 6(C) show in combination the way in which the above-described wiper arm driving section operates. FIG. 6(A) shows the driving section in a wiper arm accommodating position where the wiper assembly 10 is in the position shown in FIG. 1. When, in this state, the arm 112 is pivoted counterclockwise to reach a position at which it is directed in the direction of the arrow X, the driving section is brought to a wiper arm turning position X where the wiper assembly 10 is in the position shown in FIG. 2(A). In this state, the arm stretching motor 84 is activated to stretch the second arm 56 as shown in FIG. 2(B). As the arm 112 is rotated further counterclockwise to reach a position at which it is directed in the direction of the arrow Z as shown in FIG. 6(C), the wiper blade 54 is moved from the position AA' to the position BB' shown in FIG. 2(B). As the arm 112 is pivoted further counterclockwise to reach a position at which it is directed in the direction of the arrow Y as shown by the one-dot chain line in FIG. 6(B), the wiper blade 54 is returned to the position AA' from the position BB' shown in FIG. 2(B). The position where the arm 112 is directed in the direction of the arrow Y defines the wiper arm turning position Y.

Accordingly, as the arm 112 is pivoted from the position X to the position Y, the wiper blade 54 reciprocates once. The arm 112 is pivoted back and forth, i.e., both counterclockwise from the position X to the position Y and clockwise from the position Y to the position X.

In relation to this, when the wiper assembly 10 is in a pop-up state (see FIG. 3(B)), the first arm 58 is in the position shown in FIG. 1. If, in this state, the second arm 56 is pivoted in the direction in which it is unfolded, it is impossible to stretch the first and second arms 58 and 56 in a substantially straight line as shown in FIG. 2(B). In order to obtain a satisfactorily large wiping area, it is therefore necessary to increase the length of each of the first and second arms 58 and 56, which means that the overall length of the wiper arm and the wiper blade when they are folded cannot sufficiently be reduced.

Therefore, according to the present invention, the wiper motor 106 is temporarily activated in a state wherein the wiper assembly 10 has been popped up and the second arm 56 is folded in such a manner as to be laid on the first arm 58, so as to pivot the first arm 58 to the wiper arm turning position X (the wiping start position), and then, with the wiper motor 106 suspended, the second arm 56 is unfolded. It should be noted that the above-described operation, in which, after the wiper assembly 10 has been popped up, the wiper motor 106 is temporarily activated to pivot the first arm 58 to the wiper arm turning position X is defined as the rise-up of the first arm 58.

Referring next to FIG. 9, which shows a wiper control circuit, the wiper control is effected by a microcomputer 150. The microcomputer 150 has an input port 152 to which are input detection signals from various sensor means: namely, a rain sensor 154, a wiper mode changeover switch 156, a washer switch 158, a louver open limit switch 160, a louvr close limit switch 162, a pop-up limit switch 164, a pop-down limit switch 166, an arm expansion limit switch 168, an arm contraction limit switch 170, a wiper arm accommodated position limit switch 172, a wiper arm turning position X limit switch 174, and a wiper arm turning position Y limit switch 176.

The rain sensor 154 is constituted by, e.g., an infrared photointerrupter or a voltage element, and is adapted to detect whether or not there is rain. The wiper mode changeover switch 156 is adapted to supply the input port 152 with contact signals which respectively represent OFF, the automatic mode (AUTO), the low-speed mode (Lo) and the high-speed mode (Hi). Both the louver open limit switch 160 and the pop-up limit switch 164 are closed slightly before the wiper assembly 10 is brought to the position shown in FIG. 3(B), whereas both the louver close limit switch 162 and the pop-down limit switch 166 are closed slightly before the wiper assembly 10 is brought to the position shown in FIG. 3(A). The arm expansion limit switch 168 is closed slightly before the second arm 56 is brought to the position shown in FIG. 2(B), whereas the arm contraction limit switch 170 is closed slightly before the second arm 56 is brought to the position shown in FIG. 2(A). Further, the wiper arm accommodated position limit switch 172 is closed when the wiper driving section is in the position shown in FIG. 6(A), while the wiper arm turning position X limit switch 174 is closed when the wiper driving section reaches the position shown by the solid line in FIG. 6(B), and the wiper arm turning position Y limit switch 176 is closed when the wiper driving section reaches the position shown by the one-dot chain line in FIG. 6(B).

The microcomputer 150 has an output port 178 from which driving signals are supplied to a driver 180 so as to activate the louver motor 34, the pop-up motor 44, the arm motor 84, the wiper motor 106 and the washer motor 182. The lock current flowing when the rotation of each of the louver motor 34 and the arm motor 84 is mechanically restrained is detected by each of the lock current detectors 184 and 188 and input to the input port 152 as an interrupt signal which is supplied to a CPU 190.

The microcomputer 150 has the CPU 190 for executing a control program, a ROM 192 for storing the control program, a RAM 194 employed as a work area, the input and output ports 152 and 178, and a bus 196 for connecting together these members.

The operation of this embodiment, arranged as detailed above, will be explained below with reference to the control flowcharts shown in FIGS. 10 to 13.

FIG. 10 shows a control flowchart showing the operation executed when the wiper mode changeover switch 156 is set to the AUTO, Lo or Hi mode. The operation which is executed when the wiper mode changeover switch 156 is switched over to the Lo mode when the wiper assembly 10 is in the position shown in FIG. 3(A) will first be explained. It should be noted that the reference symbol LS in the flowcharts denotes a limit switch.

Since, in this state, the louver open limit switch 160 is OFF, the process proceeds from Step 200 to Step 202, in which the louver motor 34 is rotated in the direction in which the louver 28 is opened. The process then proceeds to Step 204, and when the louver open limit switch 160 turns ON, the pop-up motor 44 is rotated in the direction in which the wiper assembly 10 is popped up in Step 206. The process stays in Step 208 until the pop-up limit switch 164 turns ON. Meanwhile, the louver 28 reaches the position shown in FIG. 3(B), and a lock current is detected by the lock current detector 184. In consequence, the CPU 190 is interrupted to start the control flowchart shown in FIG. 11. More specifically, the cause of the interrupt is judged in Step 300, and the process proceeds to Step 302, in which the louver motor 34 is turned OFF, and the process returns to Step 208.

The employment of the louver open limit switch 160 and the lock current detector 184 enables the wiper assembly 10 to be popped up when the louver 28 is opened substantially completely, and allows the parallel processing of the louver opening operation and the pop-up operation, so that it is possible to reduce the time required to activate the wiper assembly 10. In addition, since the rotation of the louver motor 34 is suspended in response to the detection of the lock current, it becomes unnecessary to adjust the stop position of the louver 28, and the rotation of the louver motor 34 is suspended when the louver 28 is opened substantially completely, thus preventing chattering of the louver 28.

When the pop-up limit switch 164 turns ON in Step 208, the pop-up motor 44 is turned OFF in Step 209. In this state, the mole 87 is brought into close contact with the lower end portion of the front glass 12. Since the wiper assembly 10 is pivoted about the supporting point 42, the distance between the supporting point 42 and the lower end portion of the front glass 12 is sufficiently large so that there is no risk of the mole 87 applying any excessively large force to the front glass 12. Then, the process proceeds to Step 210, in which the wiper motor 106 is rotated forward. When the wiper arm turning position X limit switch 174 turns ON in Step 212, the process proceeds to Step 214, in which the operation of the wiper motor 106 is suspended. Thus, the rise-up is completed as shown in FIG. 2(A). Then, the process proceeds from Step 216 to Step 218, in which the arm motor 84 is rotated in the direction in which the second arm 56 is stretched. When the arm expansion limit switch 168 turns ON in Step 220, the process proceeds to Steps 232 and 234, and the wiper motor 106 is rotated forward at low speed in Step 234. The process then proceeds to Step 235 and stays there until the wiper arm turning position Y limit switch 176 turns ON. Meanwhile, a lock current flows through the arm motor 84 and is detected by the lock current detector 188 to start the interrupt processing shown in FIG. 11. More specifically, the process proceeds to Steps 300 and 306, and the arm motor 84 which has been turned ON in Step 218 is turned OFF in Step 306, the process then returning to Step 236. Meanwhile, the wiper blade 54 is pivoted clockwise as viewed in FIG. 2(B) in such a manner as to move from the position AA' to the position BB', and then returned to the position AA'. In consequence, the wiper arm turning position Y limit switch 176 turns ON, and the process proceeds from Step 236 to Steps 238 and 240, so that the wiper motor 106 is temporarily turned OFF and then reversed at low speed immediately therefater in Step 240. The process then proceeds to Step 242 and stays there until the wiper arm turning position X limit switch 174 turns ON. When the wiper blade 54 further makes one reciprocating motion on the surface of the front glass 12, the wiper arm turning position X limit switch 174 turns ON. The process then proceeds from Step 242 to Steps 244 and 232, and the above-described processing is repeated thereafter.

The following is a description of the operation executed when the wiper mode changeover switch 156 is switched over to the Hi mode. In this case, the process proceeds from Step 232 to Step 246 and from step 238 to Step 248 to rotate the wiper motor 106 at high speed. For the other control steps, the process proceeds in the same manner as that in the case of the above-described Lo mode.

When the wiper mode changeover switch 156 is switchd over to the AUTO mode, the operation is executed as follows. After Steps 200 to 216 have been executed in the same manner as the above, the process proceeds to Step 250, in which a 30-second timer is turned ON. The processing of Steps 252 and 254 is then repeated until a rain signal which represents that there is rain is output from the rain sensor 154. If a rain signal is received within 30 seconds, the process proceeds from Step 252 to Step 256. Since the wiper assembly 10 is in the position shown in FIG. 2(A), the process proceeds from Step 256 to Step 218, and the processing of Steps 218 to 236 is executed in the same manner as that in the case of the Lo mode, whereby the second arm 56 is stretched and the wiper blade 54 is reciprocated once on the surface of the front glass 12. Then, the process proceeds to Step 237, in which, if the microcomputer 150 receives a rain signal from the rain sensor 154, the processing of Steps 238 to 258 is executed, and the wiper blade 54 is actuated to make one reciprocating motion on the surface of the front glass 12. When the rain has stopped, no rain signal is supplied from the rain sensor 154. In consequence, the process proceeds from either Step 237 or 258 to Step 260, in which the wiper motor 106 is turned OFF when either the wiper arm turning position X limit switch 174 or the wiper arm turning position Y limit switch 176 turns ON. Then, the 30-second timer is turned ON in Step 250, and the processing of Steps 252 and 254 is repeatedly executed until a rain signal is supplied. If there is rain again within 30 seconds, the process proceeds from Step 252 to Steps 256 and 232, and the processing similar to the above is repeated thereafter.

Accordingly, if rain is sensed again within 30 seconds, the second arm 56 is allowed to remain stretched. It is therefore possible to avoid conducting the wasteful operation in which the second arm 56 is contracted and expanded again.

If no rain signal is supplied from the rain sensor 14 even when 30 seconds has elapsed after the timer has been turned ON in Step 250, the process proceeds from Step 254 to Steps 262 and 264, and the arm motor 84 is rotated in the direction in which the second arm 56 is bent. Then, when the arm contraction limit switch 170 turns ON in Step 266, the process returns to Step 250, in which the timer is turned ON again. Then, the processing of Steps 252 and 254 is repeated. While a lock current flows through the arm motor 84 and is detected by the lock current detector 188 to interrupt the CPU 190, thus starting the interrupt processing shown in FIG. 11. In other words, the process proceeds from Step 300 to Step 306, in which the arm motor 84 is turned OFF, and the process then returns. When no rain signal is received within 30 seconds, the process proceeds from Step 254 to Steps 262 and 250, and the above-described processing is repeated with the wiper assembly 10 maintained in the position shown in FIG. 2(A). When a rain signal is received in Step 252, Steps 256, 218 and 220 are executed, and the processing of Steps 232 to 258 is then repeated in the same way as the above.

Thus, in the AUTO mode, when there is no rain, the wiper assembly 10 stands by in the position shown in FIG. 2(A), whereas, when it begins to rain, the second arm 56 is stretched, and the wiper blade 54 is reciprocated. When the rain has stopped, the second arm 56 is bent, and the wiper assembly 10 stands by in the position shown in FIG. 2(A) so as to immediately cope with a rainy situation. Accordingly, the AUTO mode is extremely convenient in the case of an intermittent rain.

In the case where the wiper assembly 10 is in the position shown in FIG. 2(A), if the ignition switch is turned OFF and then turned ON and the wiper mode changeover switch 156 is set to the AUTO, Lo or Hi mode, the processing of Steps 200, 268, 270 and 272 is executed, and the process then proceeds to Step 216, from which the processing corresponding to each of the above-described modes is executed. In other words, even when the power supply is turned OFF, the operation which is to be conducted subsequently can infallibly be executed when the power supply is turned ON again.

Similarly, when the louver open limit switch 160 is ON but the pop-up limit switch 164 is OFF, Steps 200 and 268 are executed, and the process then proceeds to Step 206. When both the louver open limit switch 160 and the pop-up limit switch 164 are ON but the wiper arm turning position X limit switch 174 is OFF, Steps 200, 268 and 270 are executed, and the process then proceeds to Step 210. When all the louver open limit switch 160, the pop-up limit switch 164, the arm expansion limit switch 168 and the wiper arm turning position X limit switch 174 are ON, Steps 200, 268, 270, 272 and 274 are executed, and when the present operation mode is the AUTO mode, the process proceeds to Step 250, whereas, when the mode is either the Lo or Hi mode, the process proceeds from Step 274 to Step 232. Thus, the state before the power supply is turned OFF can be known after the power supply has been turned ON again, so that it is possible to exactly execute the operation which is to be conducted subsequently.

Figure 12A:
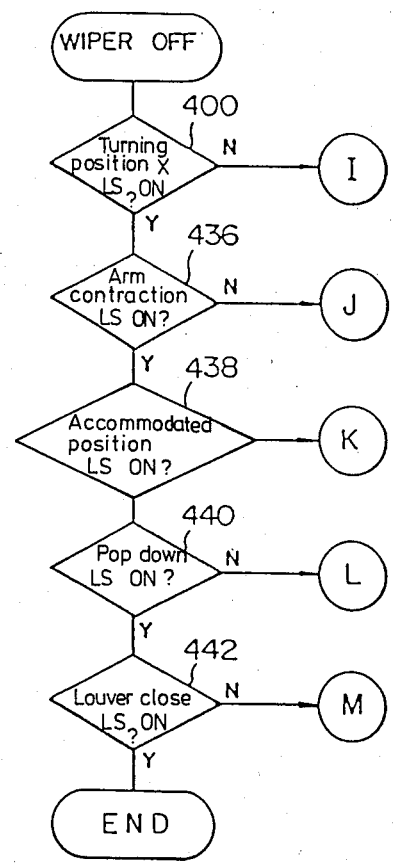
Figure 12B:
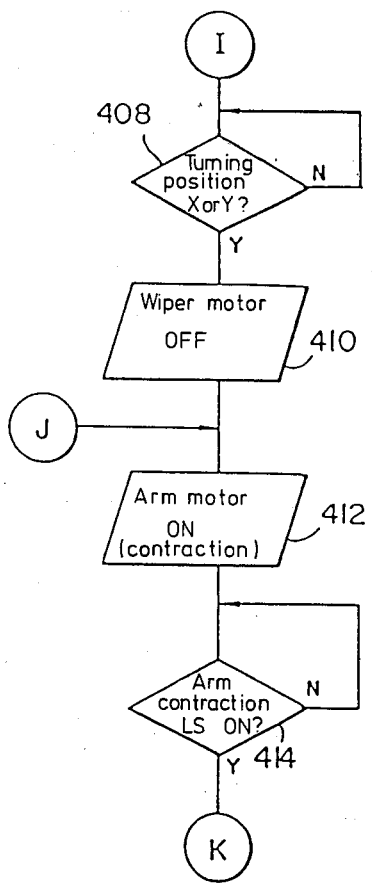
Figure 12C:
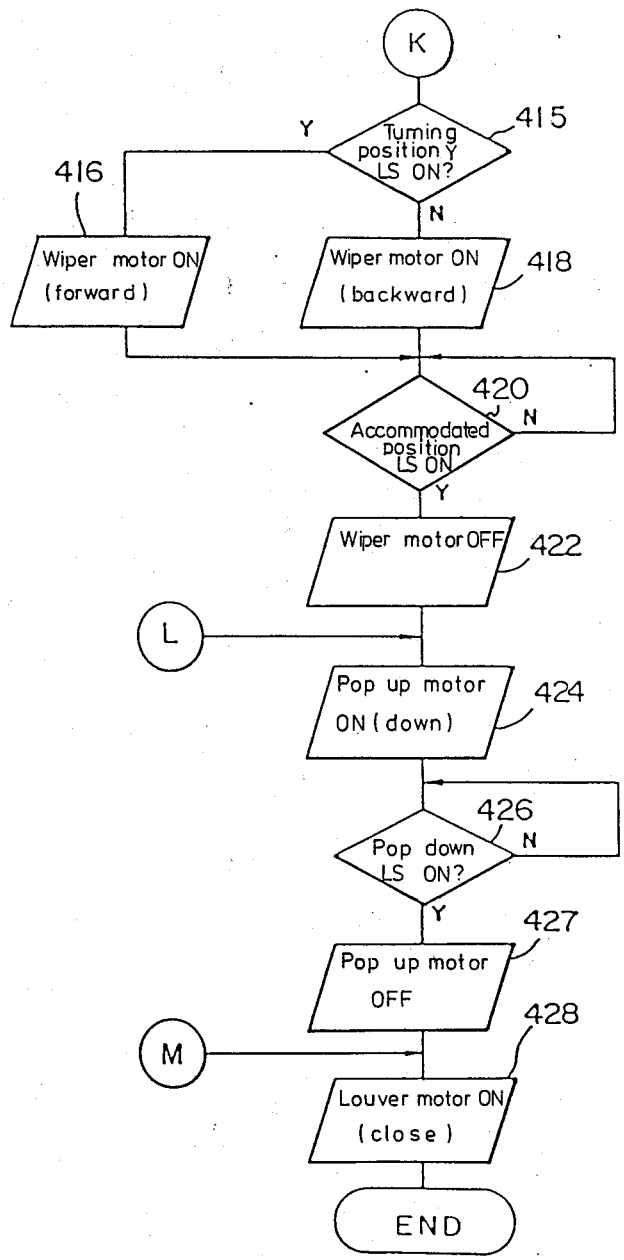

FIG. 12 is a control flowchart showing the operation which is executed when the wiper mode changeover switch 156 is switched over from AUTO, Lo or Hi mode to the OFF position. When the switch 156 is switched over to the OFF position while the wiper motor 106 is being rotated forward or backward, the process proceeds from Step 400 to Step 408. When either the wiper arm turning position Y limit switch 176 or the wiper arm turning position X limit switch 174 turns ON, the process proceeds from Step 408 to Step 410, wherein the wiper motor 106 is turned OFF. In consequence, the wiper assembly 10 is in the position shown in FIG. 2(B). The process then proceeds to Step 412, in which the arm motor 84 is rotated in the direction in which the second arm 56 is bent. When the arm contraction limit switch 170 turns ON in Step 414, the process proceeds to Step 415. When the wiper arm turning position Y limit switch 176 is ON, the wiper motor 106 is rotated forward in Step 416, whereas, when the wiper arm turning position X limit switch 174 is ON, the wiper motor 106 is rotated backward in Step 418. The process then proceeds to Step 420 and stays there until the wiper arm accommodated position limit switch 172 turns ON. Meanwhile, a lock current flows through the arm motor 84 and is detected by the lock current detector 188 to interrupt the CPU 190, thus starting the interrupt processing shown in FIG. 11. In other words, the process proceeds to Steps 300 and 306, and the arm motor 84 is turned OFF in Step 306 so that the process then returns to Step 420. When the wiper arm accommodated position limit switch 172 turns ON, the process proceeds to Step 422, in which the wiper motor 106 is turned OFF. In consequence, the wiper assembly 10 is brought to the position shown in FIG. 1. Then, the pop-up motor 44 is rotated in the direction in which the wiper assembly 10 is moved downward in Step 424. When the pop-down limit switch 166 turns ON in Step 426, the process proceeds to Step 427, in which the pop-up motor 44 is turned OFF. Then, the louver motor 34 is rotated in the direction in which the louver 28 closes the opening 29 in Step 428, thus completing the processing shown in FIG. 12. Thereafter, a lock current flows through the louver motor 34 and is detected by the lock current detector 184 to start the interrupt processing shown in FIG. 11. Namely, the process proceeds to Steps 300 and 302, and the louver motor 34 is turned OFF in Step 302, and the process returns to the main routine. Thus, the wiper assembly 10 is brought to the position shown in FIG. 3(A).

Accordingly, the front glass 12, the louver 28 and the hood 14 are flattened so that their respective surfaces are flush with each other, thereby enabling the air resistance to be minimized. In addition, since no part of the wiper assembly 10 projects from the outer surface of the vehicle body, there is no fear of the wiper assembly 10 being subjected to any undesirable external force which may be applied from a car cover, a car washing machine or the like.

In the AUTO mode, if the wiper mode changeover switch 156 is turned OFF while the wiper assembly 10 is standing by in the position shown in FIG. 2(A), Steps 400, 436 and 438 are executed, and the process then proceeds to Step 415, from which the above-described processing is executed. Similarly, when the wiper mode changeover switch 156 is turned OFF while the wiper assembly 10 is in the position shown in FIG. 2(B), Steps 400 and 436 are executed, and the process then proceeds to Step 412. When the wiper mode changeover switch 156 is turned OFF while the wiper assembly 10 is in the position shown in FIG. 1, Steps 400, 436, 438 and 440 are executed, and the process then proceeds to Step 424. When the switch 156 is turned OFF in the state where the wiper assembly 10 is in the position shown in FIG. 3(A) and the louver 28 is in the position shown by the two-dot chain line, Steps 400, 436, 438, 440 and 442 are executed, and the process then proceeds to Step 428. When the switch 156 is turned OFF in the state wherein the wiper assembly 10 is in the position shown in FIG. 3(A) and the louver 28 is in the solid line position, Steps 400, 436, 438, 440 and 442 are executed, and the processing is ended without activating any motor.

Thus, when the wiper mode changeover switch 156 is turned OFF also, the state before the power supply is turned OFF can exactly be known and the processing which is to be executed thereafter can infallibly be carried out without the need to back up the RAM 194 by means of a battery in the same manner as that in the case where the switch 156 is switched over to the AUTO, Lo or Hi mode.

Figure 13:
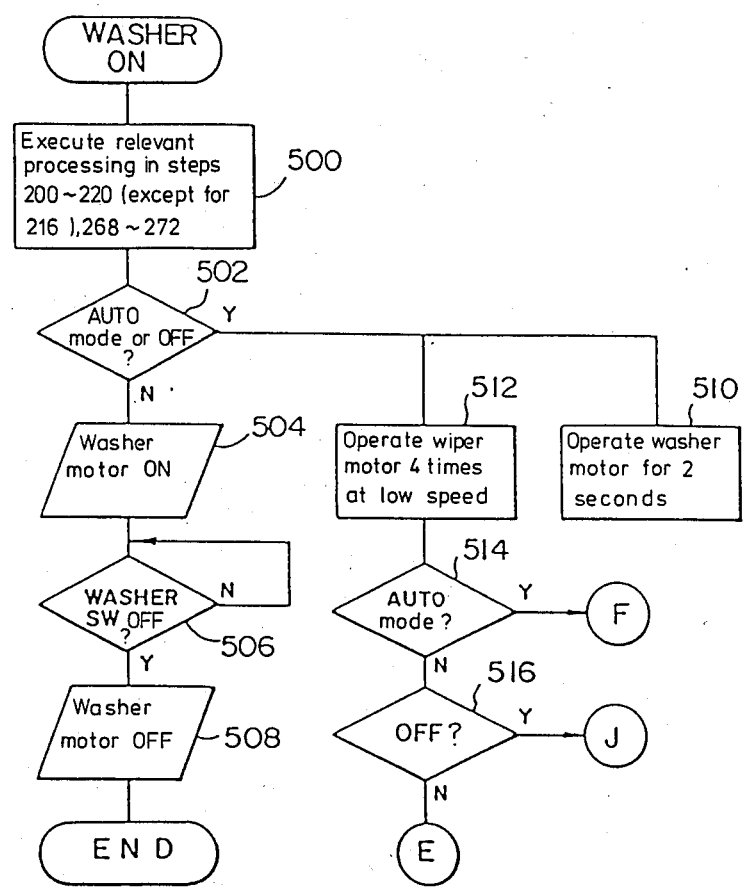

Referring next to FIG. 13, there is shown a flowchart which generally shows the operation of controlling the washer.

The washer control operation will first be explained which is executed when the washer switch 158 is turned ON in the state wherein the wiper mode changeover switch 156 is set in either the Lo or Hi mode. When Steps 200 to 220 have not yet been executed, the processing of these Steps is executed in Step 500, and the process then proceeds to Steps 502 and 504, and the washer motor 182 is turned ON to apply washing water to the surface of the front glass 12 in Step 504. Then, when the washer switch 15 is turned OFF in Step 506, the washer motor 182 is turned OFF in Step 508, thus completing the processing.

The following is a description of the washer control operation which is executed when the washer switch 158 is turned ON in the case where the wiper mode changeover switch 156 is set in the AUTO mode. When Steps 200 to 220 have not yet been executed, the processing of these Steps is completed in Step 500. It should be noted that, in this case, the process proceeds from Step 214 to Step 218. Then, the process proceeds to Steps 502, 510 and 512, and the washer motor 182 is activated for two seconds in Step 510. At the same time, the processing of Steps 232 to 242 is repeated twice. In other words, the wiper blade 54 is made to reciprocate four times. The time required for the wiper blade 54 to reciprocate four times is about five seconds. The process then proceeds from Step 514 to Step 250 to execute the processing in the AUTO mode.

When the washer switch 158 is turned ON in the case where the wiper mode changeover switch 156 is OFF, Steps 500, 502, 510 and 512 are first executed in the same manner as that in the case of the AUTO mode. Then, Steps 514, 516 are executed, and the process proceeds to Step 412 to carry out the processing which is executed in the case where the wiper mode changeover switch 156 is turned OFF. In other words, the second arm 56 is folded, and the wiper assembly 10 is brought to the position shown in FIG. 3(A).

When, in the AUTO mode, the washer switch 158 is turned ON and the wiper mode changeover switch 156 is turned OFF before the processing of Step 512 is completed, Steps 514 and 516 are executed, and the process proceeds to Step 412. However, when the washer switch 158 is turned ON while the wiper mode changeover switch 156 is OFF and the wiper mode changeover switch 156 is then switched over to the AUTO mode before the processing of Step 512 is completed, the process shifts from Step 514 to Step 250 in the same manner as that in the case where the wiper mode changeover switch 156 has been set in the AUTO mode from the first.

It should be noted that the rise-up and stretching of the wiper arm may be simultaneously effected.

Figure 14:
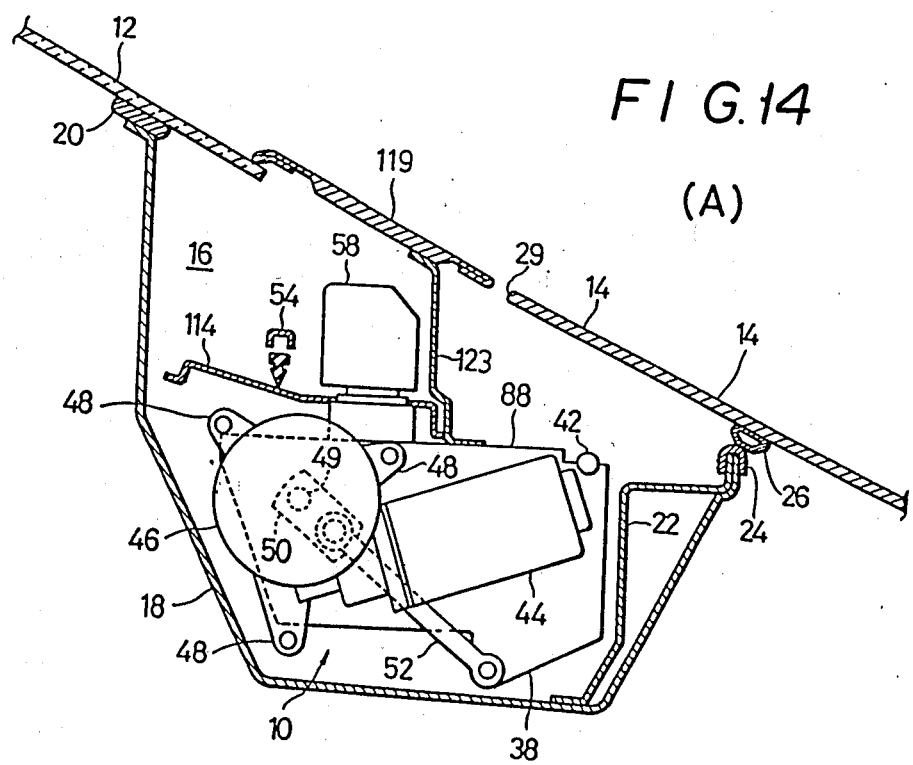
FIGS. 14(A) and 14(B) are vertical sectional views showing a second embodiment of the present invention.
Figure 14:
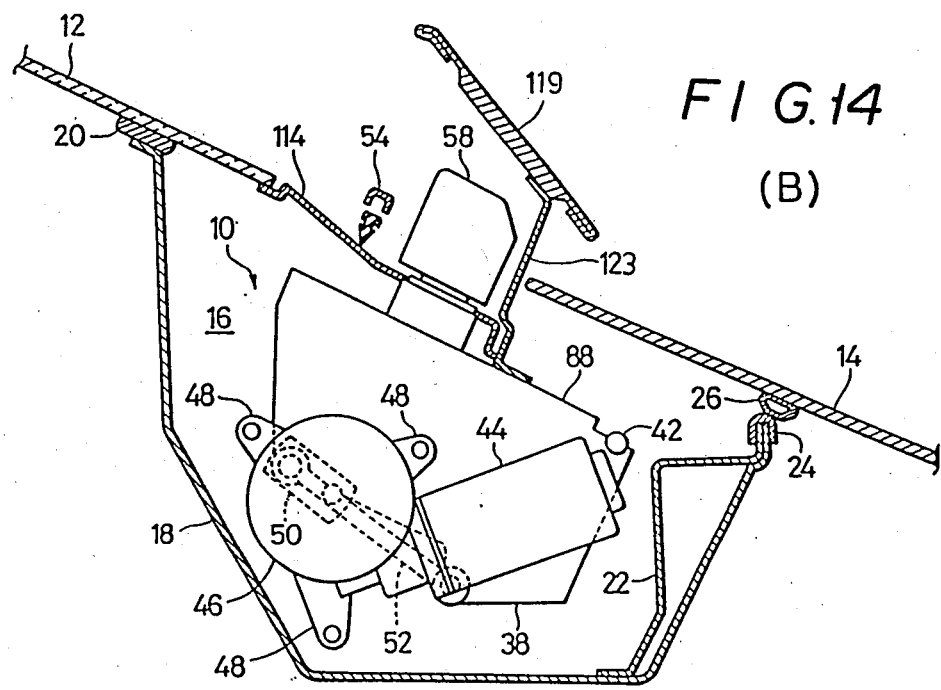

A second embodiment of the present invention will be explained below with reference to FIG. 14. In FIG. 14, the same members and portions as those in the first embodiment are denoted by the same reference numerals, and description thereof is omitted.

In this embodiment, a louver 119 is rigidly secured to the upper plate 88 of the wiper box 38 through a louver supporting arm 123. The louver supporting arm 123 is formed from a bar which is bent at both end portions thereof so as to minimize the air resistance. The louver supporting arm 123 may be provided at each end of the louver 119 in the longitudinal direction thereof (i.e., the lateral direction of the vehicle body). It is to be noted that a mole 114 is somewhat different in configuration from the mole 87 of the first embodiment.

Referring to FIG. 14(A), which shows the wiper assembly 10 in an accommodated state, the respective surfaces of the front glass 12, the louver 119 and the hood 14 are substantially flush with each other in the same manner as that in the arrangement shown in FIG. 3(A). FIG. 14(B) shows the wiper assembly 10 in a popped-up state.

Unlike the first embodiment, this embodiment has no need to provide the louver opening and closing mechanism which is constituted by the rails 30, 32, the louver motor 34, the pipe 36, etc. In consequence, it is also unnecessary to control the operation of opening and closing the louver 119. In addition, it is possible to simultaneously carry out the operation of popping up and down the wiper assembly 10 and the operation of opening and closing the louver 123, so that it is possible to reduce the time required to bring the wiper assembly 10 from the accommodated state to the operative state and vice versa.

A third embodiment of the present invention will be explained below with reference to FIG. 15.

Figure 15:
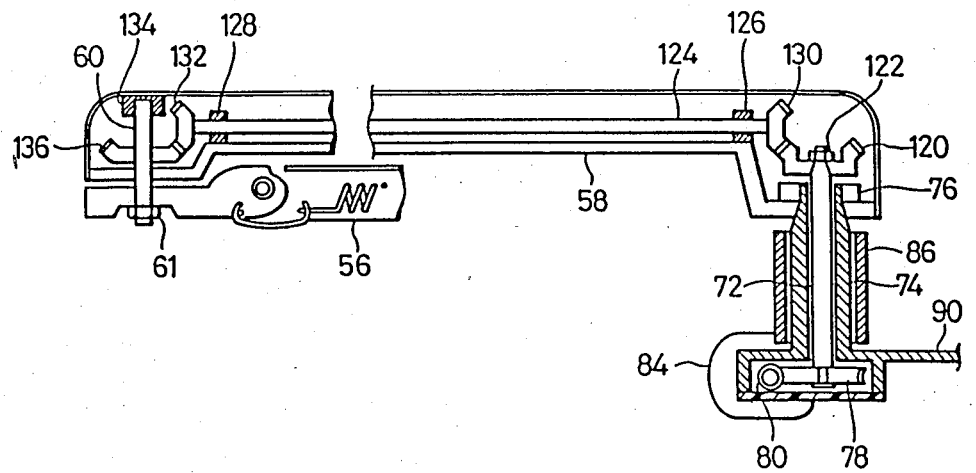
FIG. 15 is a longitudinal sectional view corresponding to FIG. 8(B), which shows a third embodiment of the present invention.

Referring to FIG. 15, which corresponds to FIG. 8(B), a bevel gear 120 is rigidly secured to the upper end of the arm stretching driving shaft 72 by means of a nut 122. Accordingly, the bevel gear 120 is coaxial with the worm wheel 78 and rotates together with it as one unit.

A shaft 124 is provided in such a manner as to extend in the longitudinal direction of the first arm 58, and both end portions of the shaft 124 are rotatably supported by bearings 126 and 128, respectively. The bearings 126 and 128 are disposed in coaxial relation to each other and are rigidly secured to the first arm 58. A bevel gear 130 is rigidly secured to one end of the shaft 124 and meshed with the bevel gear 120 so that the rotational force from the arm stretching driving shaft 72 is transmitted to the shaft 124. Similarly, a bevel gear 132 is rigidly secured to the other end of the shaft 124 and meshed with a bevel gear 136 which is rigidly secured to the arm stretching shaft 60 so that the rotational force from the shaft 124 is transmitted to the arm stretching shaft 60.

One end of the arm stretching shaft 60 is rotatably supported by an angular contact ball bearing 134 which is rigidly secured to the first arm 58. The other end of the arm stretching shaft 60 is rigidly secured to the second arm 56 by means of a nut 61. Accordingly, as the worm 80 is rotated by the arm stretching motor 84, the rotational force from the worm 80 is sequentially transmitted to the worm wheel 78, the arm stretching driving shaft 72, the bevel gears 120, 130, the shaft 124, the bevel gears 132, 136, the arm stretching shaft 60 and the second arm 56, thus causing the second arm 56 to be bent or stretched relative to the first arm 58 in accordance with the rotational direction of the arm stretching motor 84. In consequence, the overall length of the first and second arms 58 and 56 is selectively expanded and contracted.

A fourth embodiment of the present invention will next be explained with reference to FIG. 16.

Figure 16:
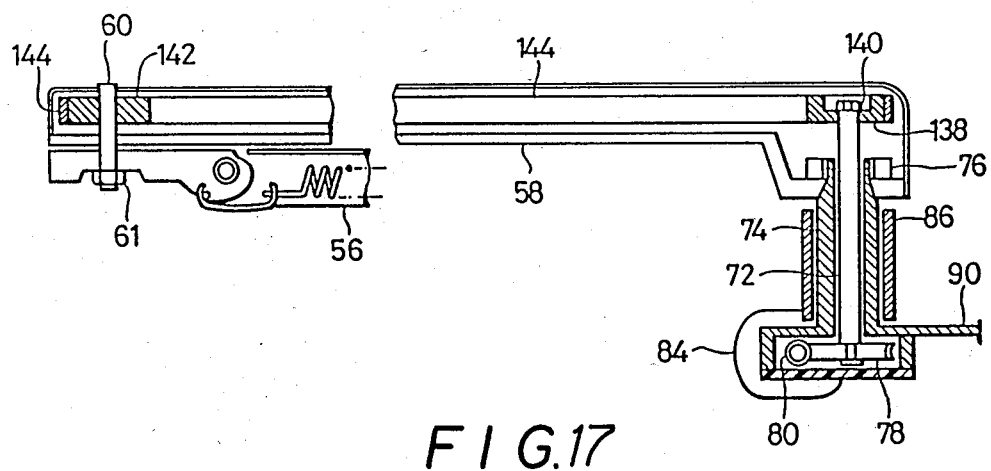
FIG. 16 is a longitudinal sectional view corresponding to FIG. 8(B), which shows a fourth embodiment of the present invention.

Referring to FIG. 16, which also corresponds to FIG. 8(B), a pulley 138 is rigidly secured to the upper end of the arm stretching driving shaft 72 by means of a nut 140. Accordingly, the pulley 138 is coaxial with the worm wheel 78 and rotates together with it in one unit.

One end of the arm stretching shaft 60 is rigidly secured to the second arm 56 by means of a nut 61, while the other end thereof is rotatably supported by the first arm 58. A pulley 142 is rigidly secured to the intermediate portion of the arm stretching shaft 60.

Figure 17:
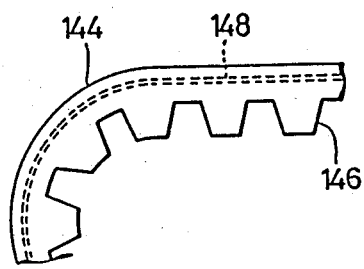
FIG. 17 is a fragmentary plan view of the synchronizing rubber belt shown in FIG. 16.

A synchronizing rubber belt 144 is stretched between the pulleys 138 and 142. As shown in FIG. 17, teeth 146 are formed on the inner surface of the belt 144, and meshed with teeth which are formed on each of the pulleys 138 and 142, thereby preventing slippage between the belt 144 and the pulleys 138 and 142. Glass fibers 148 are buried in the rubber belt 144 along the longitudinal direction thereof to reinforce the belt 144.

It should be noted that a wire or a chain may be employed in place of the rubber belt 144.

What is claimed is:

1. A concealable wiper apparatus for a vehicle, comprising:
   (a) an accommodating chamber provided inside the body of the vehicle and in the vicinity of a window glass;
   (b) a wiper assembly accommodated in said accommodating chamber having a first arm secured to a wiper arm pivoting shaft and pivoted within a predetermined angle about said shaft; a second arm secured at one end portion thereof to a wiper blade which is pressed against the surface of said window glass of the vehicle to wipe the window glass surface, the other end portion of said second arm being pivotally supported by said first arm; and stretching means for expanding and contracting the overall length of said first and second arms with a stretching mechanism for bending and stretching said second arm relative to said first arm, and an actuator for activating said stretching mechanism; and
   (c) lifting means having pivoting means for pivoting said wiper assembly between said accommodated and raised positions about a supporting point, said pivoting means having a lever crank mechanism and first driving means for activating said lever crank mechanism to vertically move said wiper assembly between an accommodated position at which said wiper assembly is accommodated in said accommodating chamber and a raised position at which said wiper assembly wipes said window glass,
   whereby, when said wiper assembly is accommodated, it is possible to reduce the air resistance to the vehicle and protect
   said wiper assembly from any external force.

2. A concealable wiper apparatus according to claim 1, wherein said first driving means includes a motor disposed in said accommodating chamber, while said lever crank mechanism includes a rotating shaft rotated by said motor disposed in said accommodating chamber, an arm having one end thereof rigidly secured to said rotating shaft, and a rod having one end thereof pivotally supported by the other end of said arm, the other end of said rod being pivotally supported by said wiper assembly, so that the rotation of said motor causes said wiper assembly to pivot about said supporting point through said rotating shaft, said arm and said rod.

3. A concealable wiper apparatus according to claim 2, wherein said accommodating chamber is provided in the upper side inside the body of the vehicle with an opening which allows said wiper assembly to be moved vertically therethrough, said wiper apparatus further comprising means for opening and closing said opening.

4. A concealable wiper apparatus according to claim 1, wherein said stretching mechanism includes a pinion rigidly secured to the other end portion of said second arm, and a rack which is incorporated in said first arm and meshed with said pinion, so that said second arm is bent and stretched relative to said first arm by the linear motion of said rack through said pinion.

5. A concealable wiper apparatus according to claim 4, wherein said rack is formed on one end portion of a rod incorporated in said first arm, the other end portion of said rod being connected to said actuator in such a manner that said rod is linearly moved by said actuator.

6. A concealable wiper apparatus according to claim 1, wherein said stretching mechanism includes a first pulley rigidly secured to said second arm, an arm stretching driving shaft extending through said wipe arm pivoting shaft, a second pulley rigidly secured to one end portion of said arm stretching driving shaft, and a synchronizing belt stretched between said first and second pulleys.

7. A concealable wiper apparatus according to claim 1, wherein said stretching mechanism includes: a first bevel gear rigidly secured to the other end portion of said second arm; a shaft incorporated in said first arm and having a second bevel gear which is rigidly secured to one end portion thereof and which is meshed with said first bevel gear, the shaft further having a third bevel gear rigidly secured to the other end portion thereof; a fourth bevel gear meshed with said third bevel gear; and an arm stretching driving shaft having said fourth bevel gear rigidly secured thereto, said arm stretching driving shaft being activated by said actuator.

8. A concealable wiper apparatus according to claim 1, wherein said actuator is rigidly secured to said wiper arm pivoting shaft in such a manner that said actuator is positioned on the other side of said wiper arm pivoting shaft which is opposite from the center of gravity of the assembly of said first and second arms and said wiper blade.

9. A concealable wiper apparatus according to claim 1, further comprising:
biasing means for biasing said wiper blade in the direction in which it is pressed against said window glass surface, said biasing means having one end portion thereof secured to said second arm and the other end portion thereof secured at a position on said first arm which is in the vicinity of a pivot point of said first arm and at which, when said second arm is stretched relative to said first arm, the biasing force from said biasing means is increased, whereas, when said second arm is bent relative to said first arm, said biasing force is decreased.

10. A concealable wiper apparatus according to claim 9, wherein said biasing means is a resilient member adapted such that, when said second arm is stretched relative to said first arm, the resilience of said resilient member is increased, whereas, when said second arm is bent relative to said first arm, the resilience of said resilient member is decreased.

11. A concealable wiper apparatus according to claim 10, wherein said resilient member is a tension coil spring, one end portion of said spring being retained by said second arm, and the other end portion of said spring being retained at a position on said first arm which is in the vicinity of a pivot point of said first arm and which is closer to said wiper arm pivoting shaft than said pivot point.

12. A concealable wiper apparatus according to claim 1, wherein said accommodating chamber is provided in the upper side inside the body of the vehicle with an opening which allows said wiper assembly to be moved vertically therethrough, said wiper apparatus further comprising means for opening and closing said opening.

13. A concealable wiper apparatus according to claim 12, wherein said opening and closing means includes a louver which is disposed in such a manner as to be movable between a closing position at which it closes said opening and an opening position at which it is accommodated in said accommodating chamber so as to open said opening, and second driving means for activating said louver to move between said closing and opening positions.

14. A concealable wiper apparatus according to claim 13, wherein said opening and closing means includes a guide rail disposed within said accommodating chamber, and a slider which is supported by said guide rail and adapted to support said louver, said slider being activated by said second driving means to move said louver between said closing and opening positions.

15. A concealable wiper apparatus according to claim 14, wherein said guide rails has a stopper secured to an end portion thereof which defines the extremity of travel of said louver for closing said opening, said louver being supported by said slider through a link bar, so that, when said slider is further activated to move by said second driving means after abutting against said stopper, said louver is raised by said link bar so as to be substantially flush with the surface of the vehicle body.

16. A concealable wiper apparatus according to claim 1, further comprising:
a louver supported by said wipe assembly and moved together with said wiper assembly, said louver being adapted such that, when said wiper assembly is accommodated, said louver closes an opening provided in the upper side of said accommodating chamber and becomes substantially flush with the surface of the vehicle body.

17. A concealable wiper apparatus according to claim 16, wherein said louver is rigidly secured to one end portion of a supporting arm rigidly secured at the other end portion thereof to a wiper box which houses said wiper assembly.

18. A concealable wiper apparatus according to claim 1, wherein said accommodating chamber is provided in the upper side inside the body of the vehicle with an opening for passing said wiper assembly, said wiper apparatus further comprising a closure member adapted to close said opening and become substantially flush with the surface of the vehicle body when said wiper assembly is in said raised position.

19. A concealable wiper apparatus according to claim 18, wherein said closure member is a mole which is supported by said wiper assembly and moved together with said wiper assembly.

20. A concealable wiper apparatus for a vehicle, comprising:
(a) an accommodating chamber provided inside a body of the vehicle and in the vicinity of a window glass provided on the vehicle body having a surface substantially flush with said window glass;
(b) a wiper assembly accommodated in said accommodating chamber having a first arm secured to a wiper arm pivoting shaft and pivoted within a predetermined angle about said shaft; a second arm secured at one end portion thereof to a wiper blade which is pressed against the surface of said window glass of the vehicle to wipe the window glass surface, the other end portion of said second arm being pivotally supported by said first arm; and stretching means for expanding and contracting the overall length of said first and second arms with a stretching mechanism for bending and stretching said second arm relative to said first arm, and an actuator for activating said stretching mechanism;
(c) lifting means, connected to said wiper assembly, having driving and linking means for vertically moving said wiper assembly between an accommodated position at which said wiper assembly is accommodated in said accommodating chamber and a raised position at which said wiper assembly wipes said window glass; and
(d) shutter means adapted to close an opening and make said window glass and the vehicle body surface substantially flush with each other when said wiper assembly is accommodated,
whereby, when said wiper assembly is accommodated, it is possible to reduce the air resistance to the vehicle and protect said wiper assembly from any external force.

21. A concealable wiper apparatus according to claim 20, wherein said shutter means includes a louver for closing said opening when said wiper assembly is accommodated, and second driving means for activating said louver to move between a closing position at which it closes said opening and an opening position at which it is accommodated in said accommodating chamber so as to open said opening.

22. A concealable wiper apparatus according to claim 21, wherein said shutter means includes a guide rail disposed within said accommodating chamber, and a slider which is supported by said guide rail and adapted to support said louver, said slider being activated by said said second driving means to move said louver between said closing and opening positions.

23. A concealable wiper apparatus according to claim 22, wherein said guide rail has a stopper secured to an end portion thereof which defines the extremity of travel of said louver for closing said opening, said louver being supported by said slider through a link bar, so that, when said slider is further activated to move by said second driving means after abutting against said stopper, said louver is raised by said link bar so as to be substantially flush with the surface of the vehicle body.

24. A concealable wiper apparatus according to claim 20, wherein said shutter means has a louver supported by said wiper assembly and moved together with said wiper assembly, said louver being adapted to close said opening when said wiper assembly is accommodated.

25. A concealable wiper apparatus according to claim 24, wherein said louver is rigidly secured to one end portion of a supporting arm rigidly secured at the other end portion thereof to a wiper box which houses said wiper assembly.

26. A concealable wiper apparatus according to claim 20, further comprising:
a closure member adapted to close said opening and make said window glass and the vehicle body surface substantially flush with each other when said wiper assembly is at the raised position.

27. A concealable wiper apparatus according to claim 26, wherein said closure member is a mole which is supported by said wiper assembly and moved together with said wiper assembly.

28. A concealable wiper apparatus according to claim 20, wherein said lifting means includes pivoting means for pivoting said wiper assembly between said accommodated and raised positions about a supporting point.

29. A concealable wiper apparatus according to claim 28, wherein said pivoting means has a lever crank mechanism and first driving means for activating said lever crank mechanism.

30. A concealable wiper apparatus according to claim 29, wherein said first driving means includes a motor disposed in said accommodating chamber, while said lever crank mechanism includes a rotating shaft rotated by said motor disposed in said accommodating chamber, an arm having one end thereof rigidly secured to said rotating shaft, and a rod having one end thereof pivotally supported by the other end of said arm, the other end of said rod being pivotally supported by said wiper assembly, so that the rotation of said motor causes said wiper assembly to pivot about said supporting point through said rotating shaft, said arm and said rod.

31. A concealable wiper apparatus according to claim 20, wherein said stretching mechanism includes a pinion rigidly secured to the second end portion of said second arm, and a rack which is incorporated in said first arm and meshed with said pinion, so that said second arm is bent and stretched relative to said first arm by the linear motion of said rack through said pinion.

32. A concealable wiper apparatus according to claim 31, wherein said rack is formed on one end portion of a rod incorporated in said first arm, the other end portion of said rod being connected to said actuator in such a manner that said rod is linearly moved by said actuator.

33. A concealable wiper apparatus according to claim 20, wherein said stretching mechanism includes a first pulley rigidly secured to said second arm, an arm stretching driving shaft extending through said wiper arm pivoting shaft, a second pulley rigidly secured to one end portion of said arm stretching driving shaft, and a synchronizing belt stretched between said first and second pulleys.

34. A concealable wiper apparatus according to claim 20, wherein said stretching mechanism includes: a first bevel gear rigidly secured to the other end portion of said second arm; a shaft incorporated in said first arm and having a second bevel gear which is rigidly secured to one end portion thereof and which is meshed with said first bevel gear, said shaft further having a third bevel gear rigidly secured to the other end portion thereof; a fourth bevel gear meshed with said third bevel gear; and an arm stretching driving shaft having said fourth bevel gear rigidly secured thereto, said arm stretching driving shaft being activated by said actuator.

35. A concealable wiper apparatus according to claim 20, wherein said actuator is rigidly secured to said wiper arm pivoting shaft in such a manner that said actuator is positioned on the other side of said wiper arm pivoting shaft which is opposite from the center of gravity of the assembly of said first and second arms and said wiper blade.

36. A concealable wiper apparatus according to claim 20, further comprising:
biasing means for biasing said wiper blade in the direction in which it is pressed against said window glass surface, said biasing means having one end portion thereof secured to said second arm and the other end portion thereof secured at a position on said first arm which is in the vicinity of a pivot point of said first arm and at which, when said second arm is stretched relative to said first arm, the biasing force from said biasing means is increased, whereas, when said second arm is bent relative to said first arm, said biasing force is decreased.

37. A concealable wiper apparatus according to claim 36, wherein said biasing means is a resilient member adapted such that, when said second arm is stretched relative to said first arm, the resilience of said resilient member is increased, whereas, when said second arm is bent relative to said first arm, the resilience of said resilient member is decreased.

38. A concealable wiper apparatus according to claim 37, wherein said resilient member is a tension coil spring, one end portion of said spring being retained by said second arm, and the other end portion of said spring being retained at a position on said first arm which is in the vicinity of a pivot point of said first arm and which is closer to said wiper arm pivoting shaft than said pivot point.

39. A concealable wiper apparatus for a vehicle having a wiper assembly and shutter means, said wiper assembly being accommodated in an accommodating chamber provided inside the body of the vehicle and in the vicinity of a window glass during an inoperative condition, whereas, when said wiper assembly is to be operated, said wiper assembly is raised from said accommodating chamber through an opening provided in the upper side of said accommodating chamber to wipe the surface of said window glass, said wiper assembly comprising: a first arm supported by a wiper arm pivoting shaft and pivoted within a predetermined angle about said shaft; a second arm secured at one end portion thereof to a wiper blade, the other end portion of said second arm being pivotally supported by said first arm; and stretching means for expanding and contracting the overall length of said first and second arms, whereby it is possible to minimize the space required to provide said accommodating chamber and reduce the air resistance to the vehicle when said wiper assembly is accommodated, said shutter means opening and closing said opening and including a louver for closing said opening when said wiper assembly is accommodated and including driving means for activating said louver to move between a closing position at which it closes said opening and an opening position at which it is accommodated in said accommodating chamber so as to open said opening.

40. A concealable wiper apparatus according to claim 39, wherein said shutter means includes a guide rail disposed within said accommodating chamber, and a slider which is supported by said guide rail and adapted to support said louver, said slider being activated by said second driving means to move said louver between said closing and opening positions.

41. A concealable wiper apparatus according to claim 40, wherein said guide rail has a stopper secured to an end portion thereof which defines the extremity of travel of said louver for closing said opening, said louver being supported by said slider through a link bar, so that, when said slider is further activated to move by said second driving means after abutting against said stopper, said louver is raised by said link bar so as to be substantially flush with the surface of the vehicle body.

42. A concealable wiper apparatus according to claim 39, wherein said shutter means has a louver supported by said wiper assembly and moved together with said wiper assembly, said louver being adapted to close said opening when said wiper assembly is accommodated.

43. A concealable wiper apparatus for a vehicle, comprising:
  (a) an accommodating chamber provided inside a body of the vehicle and in the vicinity of a window glass provided on the vehicle body, said accommodating chamber having a surface substantially flush with said window glass;
  (b) a wiper assembly accommodated in said accommodating chamber;
  (c) lifting means for vertically moving said wiper assembly between an accommodated position at which said wiper assembly is accommodated in said accommodating chamber and a raised position at which said wiper assembly wipes said window glass;
  (d) shutter means adapted to close an opening and to make said window glass and the vehicle body surface substantially flush with each other when said wiper assembly is accommodated; and
  (e) closure means including a mole supported by said wiper assembly to move therewith for closing said opening and making said window glass and the vehicle body surface substantially flush with each other when said wiper assembly is at the raised position,
  whereby, when said wiper assembly is accommodated, it is possible to reduce the air resistance to the vehicle and protect said wiper assembly from any external force.

44. A concealable wiper apparatus for a vehicle, comprising:
  (a) an accommodating chamber provided inside a body of the vehicle and in the vicinity of a window glass provided on the vehicle body, said accommodating chamber having a surface substantially flush with said window glass;
  (b) a wiper assembly accommodated in said accommodating chamber having a first arm secured to a wiper arm pivoting shaft and pivoted within a predetermined angle about said shaft; a second arm secured at one end portion thereof to a wiper blade which is pressed against the surface of said window glass of the vehicle to wipe the window glass surface, the other end portion of said second arm being pivotally supported by said first arm; and stretching means for expanding and contracting the overall length of said first and second arms with a stretching mechanism for bending and stretching said second arm relative to said first arm, and an actuator for activating said stretching mechanism;
  (c) lifting means having pivoting means for pivoting said wiper assembly between accommodated and raised positions about a supporting point, said pivoting means having a lever crank mechanism and first driving means for activating said lever crank mechanism for vertically moving said wiper assembly between an accommodated position at which said wiper assembly is accommodated in said accommodating chamber and a raised position at which said wiper assembly wipes said window glass;
  (d) shutter means adapted to close an opening and make said window glass and the vehicle body surface substantially flush with each other when said wiper assembly is accommodated; and (e) biasing means for biasing said wiper blade in the direction in which it is pressed against said window glass surface, said biasing means having one end portion thereof secured to said second arm and the other end portion thereof secured at a position on said first arm which is in the vicinity of a pivot point of said first arm and at which, when said second arm is stretched relative to said first arm, the biasing force from said biasing means is increased, whereas, when said second arm is bent relative to said first arm, said biasing force is decreased, whereby, when said wiper assembly is accommodated, it is possible to reduce the air resistance to the vehicle and protect said wiper assembly from any external force.

* * * * *